United States Patent [19]

Klatt

[11] Patent Number: 4,630,508
[45] Date of Patent: Dec. 23, 1986

[54] METHOD AND APPARATUS TO DETERMINE CONSTANT SPEED TORQUE ON AN ENGINE

[75] Inventor: Alfred Klatt, Wathlingen, Fed. Rep. of Germany

[73] Assignee: WABCO Westinghouse Fahrzeugbremsen GmbH, Hanover, Fed. Rep. of Germany

[21] Appl. No.: 590,247

[22] Filed: Mar. 16, 1984

[30] Foreign Application Priority Data

| Mar. 28, 1983 | [DE] | Fed. Rep. of Germany | 3311254 |
| Mar. 28, 1983 | [DE] | Fed. Rep. of Germany | 3311295 |
| Mar. 28, 1983 | [DE] | Fed. Rep. of Germany | 3311306 |
| Apr. 23, 1983 | [DE] | Fed. Rep. of Germany | 3314800 |

[51] Int. Cl.$^4$ ............................................. B60K 41/06
[52] U.S. Cl. .................................... 74/866; 74/862; 74/865; 364/424.1
[58] Field of Search .............. 74/843, 861, 862, 865, 74/866; 364/424.1

[56] References Cited

U.S. PATENT DOCUMENTS

| 3,680,410 | 8/1972 | Sumiyoshi et al. | 74/866 |
| 3,876,028 | 4/1975 | Asano et al. | 74/866 X |
| 4,044,634 | 8/1977 | Florus et al. | 74/866 |
| 4,102,222 | 7/1978 | Miller et al. | 74/866 |
| 4,282,780 | 8/1981 | Totani et al. | 74/866 |
| 4,285,252 | 8/1981 | Yamaki et al. | 74/866 |
| 4,380,048 | 4/1983 | Kishi et al. | 364/424.1 |
| 4,425,620 | 1/1984 | Batcheller et al. | 364/424.1 |
| 4,485,443 | 11/1984 | Knodler et al. | 74/843 X |

FOREIGN PATENT DOCUMENTS

| 007881 | 2/1980 | European Pat. Off. |
| 2108987 | 9/1972 | Fed. Rep. of Germany |
| 2113116 | 4/1976 | Fed. Rep. of Germany |
| 2756719 | 7/1978 | Fed. Rep. of Germany |
| 2811574 | 9/1979 | Fed. Rep. of Germany |
| 2929266 | 3/1980 | Fed. Rep. of Germany |
| 2836082 | 3/1980 | Fed. Rep. of Germany |
| 2852195 | 6/1980 | Fed. Rep. of Germany |
| 3012896 | 10/1980 | Fed. Rep. of Germany |
| 2933714 | 3/1981 | Fed. Rep. of Germany |
| 3032403 | 3/1981 | Fed. Rep. of Germany |
| 2952204 | 6/1981 | Fed. Rep. of Germany |
| 3013032 | 10/1981 | Fed. Rep. of Germany |
| 3018032 | 11/1981 | Fed. Rep. of Germany |
| 3019711 | 4/1982 | Fed. Rep. of Germany |
| 3101056 | 8/1982 | Fed. Rep. of Germany |
| 3145687 | 6/1983 | Fed. Rep. of Germany |
| 3240236 | 7/1983 | Fed. Rep. of Germany |
| 3246201 | 6/1984 | Fed. Rep. of Germany |
| 2315641 | 1/1977 | France | 74/866 |
| 7918253 | 7/1979 | France |
| 2052651 | 1/1981 | United Kingdom | 74/866 |
| 2053387 | 2/1981 | United Kingdom |
| 867710 | 9/1981 | U.S.S.R. | 74/865 |

Primary Examiner—Leslie A. Braun
Assistant Examiner—Dwight G. Diehl
Attorney, Agent, or Firm—J. O. Ray, Jr.

[57] ABSTRACT

An apparatus for generating signal values that are representative of the vehicle engine's momentary drive torque, the weight of the vehicle, and the acceleration of the vehicle. The constant speed drive torque is then determined in a computing device which subtracts the product of the signal value of the vehicle weight and the signal value of the vehicle acceleration from the signal value for the momentary drive torque and a signal value that is representative of the constant speed drive torque of the vehicle engine is generated. This constant speed drive torque signal value is applied in the method for governing a vehicle control device.

56 Claims, 7 Drawing Figures

METHOD AND APPARATUS TO DETERMINE CONSTANT SPEED TORQUE ON AN ENGINE

BACKGROUND OF THE INVENTION

The present invention relates, in general, to control equipment for the transmission of a motor vehicle and, more particularly, the invention is directed to a control mechanism for either an automatic or manual transmission that provides a balance between good fuel economy and engine performance of a motor vehicle equipped with the transmission control mechanism of the invention.

In vehicles equipped for manually shifting such vehicle's transmission, especially in commercial and utility type over-the-road vehicles, it may be the case that the torque for the newly selected gear to be shifted into is insufficient to permit driving the vehicle at the same speed which prevailed before the gear was shifted. When such a speed reduction occurs, it often times will require a down-shifting of gears in the transmission. The judgment and anticipation by the driver of the vehicle of such an adverse occurrence is difficult at best, and may not always be accurate for a number of reasons. An incorrect estimation or prediction by the driver, which brings about a faulty shifting, almost always results in an uneconomical vehicle operation. This is especially true in regard to a higher fuel consumption. Furthermore, such predictions by the driver, based on his judgment alone, are very difficult and therefore they are often imprecise.

The situations described above can also be incurred with vehicles equipped with transmissions for automatically shifting gears. Such automatic transmission gears are therefore designed in such a way that they can only be shifted into a new gear position if and when a high torque, or performance reserve, is available. In some cases, an extremely high torque reserve is required before shifting such gears can occur. This means that the operation of the vehicle thus equipped is also uneconomical, especially with regard to lower fuel consumption.

The selection, or choice, of the most advantageous point of operation for a vehicle drive train, consisting of a motor and a gear transmission, depends on many factors. A number of these factors are outside the control of the driver. Even a definition of the term "best or most advantageous operating point" is difficult, because the point of the most economical fuel consumption, as represented by a family of curves relating to the motor characteristics, is not necessarily the point of maximum motor performance and/or output. Depending on operating requirements and other outside conditions, the selection of the gear speed must be varied for economical operation between criteria selected from several different operating points, which was considered operationally "advantageous". The quality and value of such selected criteria will heavily depend also on the ability to maintain constant the level of the value or data selected. This is not easily accomplished. If, for example, motor torque is determined as one of the motor factors selected as a criteria; then such determination is dependent on the fuel density, the elevation at which the motor is being operated, the fuel quality, the motor temperature, and others. If the motor factors, such as the data representing the motor torque, are compared with either theoretically or empirically derived constants, the result will often show a flaw as soon as even one of the many influence factors enumerated and discussed above shows a deviation.

An immediate task that could represent one possible solution for eliminating such flaws and to overcome the above problems, would be to gather as much data as possible on as many of the influence factors as possible, and to evaluate the collected data on them on their own terms. To accomplish this would require the use of an appropriate individual sensor for each individual factor. This would, however, constitute a great expense that probably cannot be justified.

In addition, the precision and accuracy with which a given value can be determined is of great importance with respect to determining the shifting points for the transmission gears, especially in connection with commercial and utility vehicles, which have a large ratio between load and empty operations. If, for example, the drive resistance occurring on the vehicle at a more or less substantially constant velocity is to be accurately determined for such vehicle; then the values and data for this selected criteria, such as any changes in the air resistance coefficient $C_W$, would have to be examined regarding various structural or design modifications, air density, changing rolling friction of the tires against the roadway at various tire profiles, pressures and wear conditions and friction conditions (i.e., wet or dry roadway surfaces), roadway cross-section, etc. would also have to be determined. Added to this fact, it should also be pointed out that specific values for certain data, such as bearing friction and gear efficiency, cannot be determined at a reasonable cost for standard vehicles which are mass-produced. This serves to further compound the above-discussed problems of gear selection relating to the achievement of good economy with respect to fuel consumption while retaining good performance on the vehicle engine.

SUMMARY OF THE INVENTION

The present invention provides a control system for a motor vehicle transmission which provides a good balance between fuel economy and engine performance. The apparatus and principles of the invention ar applicable to both manually-operated or automatic transmissions. The control system comprises a memory storage device, having a family of curves stored therein which relate to the motor, and from which the determination of the instantaneous starting torque of the motor can be determined. Also provided, is a means for determining an acceleration value of the vehicle. In addition, a provision is made for providing the control system with the weight of the vehicle utilizing the starting torque and acceleration values for computing such vehicle weight. A momentum control system is provided for computing a stationary torque on momentum that is necessary for nonaccelerated driving of the vehicle. Also provided, is a transmission control device which compares the stationary starting torque with the stored values of a comparator, and which then generates a control signal for the changing of gears in the transmission whenever the stored values are either exceeded, or if one falls short of the same.

OBJECTS OF THE INVENTION

It is, therefore, one of the primary objects of the invention to provide a transmission control system for a motor vehicle which will balance good fuel economy with good operating performance of the engine.

Another object of the invention is to provide a transmission control system for a motor vehicle to accurately determine precise gear shifting points which utilizes a minimum number of individual sensing units.

Yet another object of the invention is to provide a transmission control system for a motor vehicle with the ability to determine, in an accurate manner, whether the drive torque for the new gear that has been selected is sufficient to allow the vehicle to move at the same speed as the prior gear.

Still another object of the invention is to provide a transmission control system for a motor vehicle to accurately determine whether the newly selected gear position is at a more advantageous position than the previous gear position.

A further object of the invention is to provide a transmission control system for a motor vehicle that will provide a good balance between lower fuel consumption and engine performance that is applicable to both an automatic transmission as well as a manually-operated transmission.

These and various other objects and advantages of the transmission control system of the invention will become more apparent to those persons skilled in the art as the following detailed description proceeds, when such description is taken in conjunction with the attached drawings and appended claims.

BRIEF DESCRIPTION OF THE VARIOUS EMBODIMENTS

Figure 1:
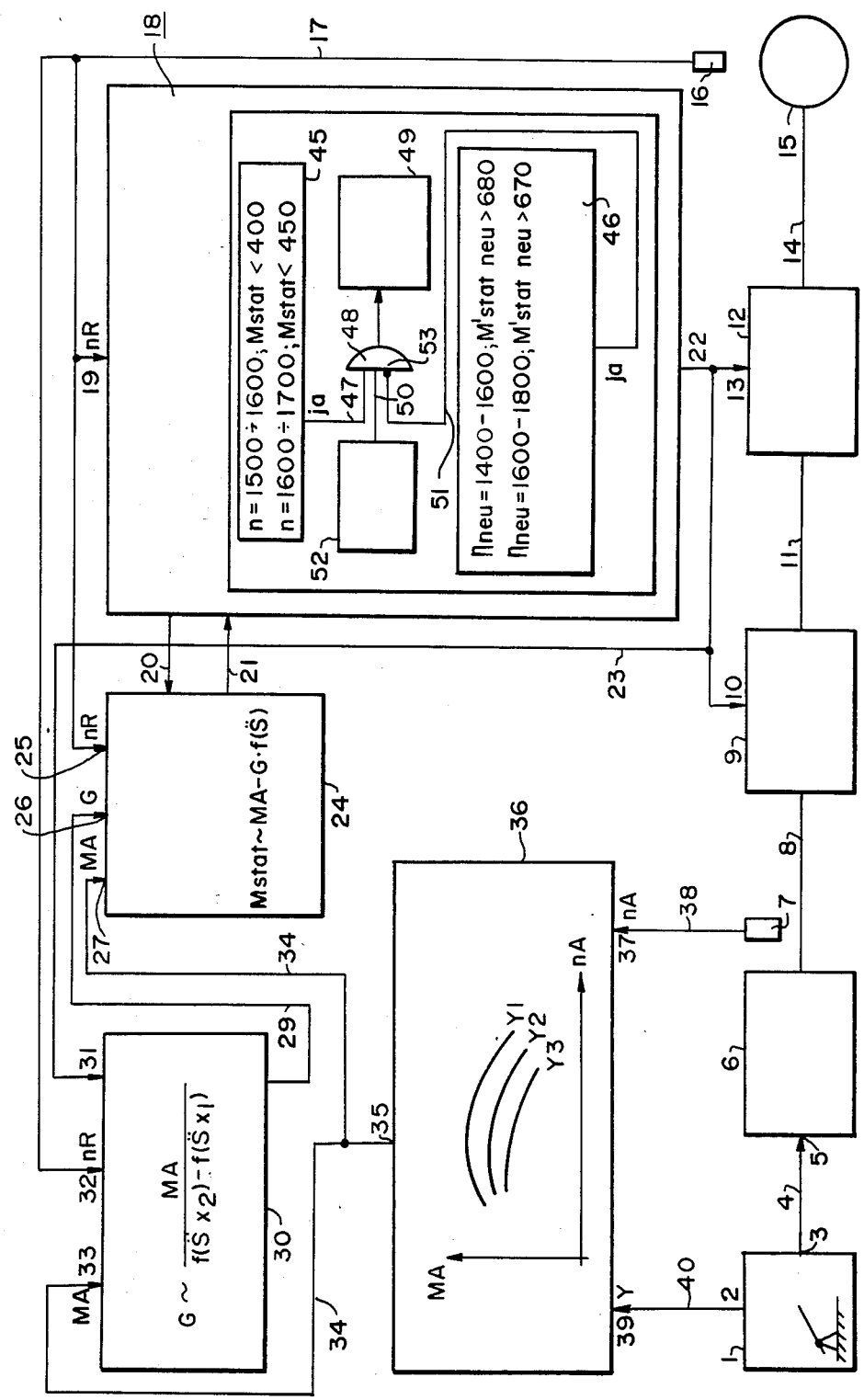
FIG. 1 is a schematic diagram showing the essential elements of one embodiment of the invention.

The invention for a transmission control system used for selecting gear changes in a motor vehicle, to be described hereinafter, is based on certain knowledge and assumptions of the following variables.

At any given point in time, the motor vehicle instantaneous driving or momentary drive torque $M_A$ for any such given moment, consists of a stationary drive torque $M_{stat}$, which is necessary for the continuation of the vehicle's movement without either acceleration or deceleration. The instantaneous, or momentary drive torque $M_A$, also includes within its parameters an acceleration moment, or torque $M_b$, which can cause either an acceleration or deceleration of the vehicle. This then means that the stationary drive torque $M_{stat}$ should accordingly be calculated as follows:

$$M_A = M_{stat} + M_b,$$

$$M_b = G \cdot f(\ddot{s}), \text{ and}$$

$$M_{stat} \propto M_A - G \cdot f(\ddot{s}),$$

whenever values for $M_A$, G and $\ddot{s}$ are either available or measurable.

The values in the above equations are defined, for the purposes of this invention, as follows:

$M_{stat}$ = stationary or constant speed drive torque or moment $M_A$ = momentary drive force $M_b$ = acceleration moment or torque G = vehicle weight $\ddot{s}$ = vehicle acceleration.

The expression $f(\ddot{s})$, as used in this specification, means that the vehicle acceleration can be applied and may have a special factor provided, or joined, with other given factors to be considered. All data values for $f(\ddot{s})$ can be derived from actual data values.

The stationary moment, or constant speed drive torque $M_{stat}$, as used in this specification in describing the invention, mean the same can be perceived and expressed as the sum of the vehicle driving resistances at a more or less substantially constant driving speed. Such driving resistances include, but are not necessarily limited to, such things as rolling friction, air friction, and roadway incline.

As the data values to the right of the formula for $M_{stat}$ can be easily, and even more importantly, economically determined; the cumbersome, difficult, and often times imprecise determination of individual drive resistances can be avoided in the practice of this invention.

The specific vehicle weight G, which is necessary for evaluating and determining $M_{stat}$, must be as precise as feasibly possible and can be determined by way of the vehicle acceleration, as described in my earlier and still copending U.S. patent application Ser. No. 557,789, filed Dec. 5, 1983, and which is incorporated herein by reference. It is important that the exact weight is known. It is not sufficient, in the practice of this invention, to have an estimated weight; for example, as shown in previous prior art teachings of German Pat. Nos. 3,018,032 and 3,101,056, wherein the vehicle is operated using an assumed weight, and which prior art is also incorporated herein by reference.

See German Pat. No. 3,018,032 in particular, which gives a precise description of various drive conditions that are useful within the equation. Additionally, the data for drive resistance, partial drive resistance, and the vehicle mass are also introduced. The application and use of physical relationships and values in conjunction with assumed values in the equations, makes it possible to then transform such data values in such a way that other selected criteria can be evolved which provides further utility. The application of such data can only be used in certain drive situations, however, and cannot be applied in general. The values, which are used for comparison, must be empirically adjusted and applied in order to prevent errors and misapplications. With commercial and utility-type vehicles, which in general have a considerable ratio between load and empty conditions, and which in many cases are largely underpowered; insufficient data for wide ranges of such method of shifting would be provided, and in which case the results would be less than satisfactory.

To provide a meaningful, usable, and accurate transmission control function, it is important to determine, for example, the reason for a vehicle acceleration which is deemed too low. In addition, it may be important to know where such insufficient vehicle acceleration originates. The reason can be, among other things, the vehicle weight, the existing roadway incline, or both. With the suggested apparatus and method of the invention, this data can be determined with a greater accuracy. To do this, necessitates the use of a more extensive formula system of specific composition and arrangement, in which a more specific data interrelationship prevails.

Further, German Pat. Nos. 3,018,032 and 3,101,056 do not show that the motor torque of a vehicle can only be determined by way of a motor graph, which relates an acceleration value to a range of characteristic values and the relation of pulsating values to this data, whereby foreign influences on the motor may be eliminated. This achievement is only made possible if conducted with the suggested larger formula system of this invention.

The question of whether the maximum, or maximum permissible motor torque, will be overstepped with a newly selected gear, can only be answered with some degree of certainty if the individual parameters can be more exactly determined.

According to the various embodiments of the invention, all of the parameters to be determined will be based on factors which have already been fixed.

In prior art German Pat. No. 2,933,714, incorporated herein by reference, and the aforementioned German Pat. No. 3,101,056, there are described devices which can determine the most advantageous point of operation. This refers to the drive torque which is developed momentarily by the vehicle motor.

The present invention, on the other hand, helps to determine the most advantageous point of vehicle operation for the stationary drive torque, i.e., the torque required for overcoming such vehicle's travel resistances. To determine the most advantageous operating point, it is important to determine the influence factors used with the greatest possible accuracy, as each percentile of efficiency improvement in such determination will improve the operation of the vehicle.

The placing of the stationary torque into the economical operating range, and not the momentary torque, offers the advantage of economically efficient operation, as the vehicle will terminate the acceleration process (i.e., more fuel being consumed) after a brief time, and continue at a constant speed. For this condition, the most advantageous point of operation must be found such that no further shifting will be necessary when the acceleration process has been ended.

The various embodiments of the present invention thus allow for the values used for calculations to be based on firmly established predetermined data.

Contrary to that of the prior art methods and apparatus, in the shifting according to the present invention, the values are determined without assumption and thus more accurately. This then offers the potential for good economical operation and performance.

Furthermore, in the referenced prior art, no consideration was taken of the fact that the motor moments of the vehicle can only be determined via a family of motor curves or characteristics which suitably refers the threshold values to these values, in order to thus eliminate external disruptive influences on the motor. This, in return, can only be determined with the aid of a larger equation system.

Especially in connection with driving situations that can frequently occur in which the vehicle is being driven at maximum power and at high motor RPMs, where one or more higher gears are still available, it is very difficult to find criteria which is sufficiently precise to make a suitable decision for or against shifting to a higher gear. Since in such a case less power is available after the shifting, this could be viewed by the driver as something quite negative, due to the fact that the speed of the vehicle may be reduced. On the other hand, however, the vehicle's fuel consumption would be significantly reduced because of the small drop in power. In other words, a criterion must be utilized that is sufficiently precise so that it is possible to keep justifiable losses in performance within a very narrow range of tolerance. This is made possible due to the arrangement described by the invention because, especially the external factors affecting the motor from the outside, are eliminated by referring the threshold values to the values available in the motor-family of curves.

It has been found suitable to carry out a performance or momentum-giving determination for the stationary torque $M_{stat}$ and not the instantaneous torque $M_A$ during an acceleration process, since the acceleration process is limited with regard to time. Thus, the respective driving situation which exists at any given time is taken into consideration. In this manner, all faulty shifting may be avoided.

Furthermore, based on the development of the apparatus according to the present invention with regard to computation of (if possible) all necessary values, the vehicle is operated from once fixed values.

In the case suggested by the present invention, the range of characteristic values for the family of curves of the vehicle motor under certain operating conditions, whereby the motor starting torque or momentum $M_A$ is plotted in relation to rotational speed of the motor $n_A$ (RPMs) for various control points of the operation, such values are retained in a memory storage device. All required data, such as $M_A$, G and $M_{stat}$, for a few examples, will be derived from these values in conjunction with other data. The maximum or limiting values for possible drive torques and rotational limit values, which were determined theoretically and empirically for measuring performance and establishing the most advantageous shifting criteria for comparison with the value for $M_{stat}$, are also projected against, and compared with, the data for the determined value range in the memory storage device. This method has the distinct and great advantage of keeping the data ratio constant during modification of the value range, such as during changes of fuel density or different elevation, thus values are obtained which are free of flaws. Also, one can store in the memory device, the theoretical or empirical values for pulsating loads $M_{opt}$, which are compared with the value for $M_{stat}$ for determining shifting criteria, and which refer to the values in the characteristic field.

If, for example, the motor torque or momentum is measured directly and compared with the theoretically or empirically determined fixed values, a value correction will have to be made whenever outside influences force a correction of the motor torque, in order to obtain a flawless result.

This invention avoids these problems in addition to a number of other possible flaws and/or errors.

A comparison of theoretically and empirically determined torques or moments with the stationary torque $M_{stat}$, by means of available data, has the following advantage:

Whenever a determination of the possible maximum or adequately achievable torque for a given criteria is to be made before shifting the transmission gear into a new position (e.g., by limiting the start-up torque with the rotational limit) and the drive torque is larger than the transformed stationary drive torque, according to the gear ratio and the respective stationary drive torque transmitted, it can be predicted how the vehicle will continue after a gear-shifting operation; that is, if it will continue with the speed which prevailed before shifting. If desired or found necessary, a blocking mechanism may be provided that will prevent the shifting into a gear position which is disadvantageous.

If, prior to the selection of a new gear, a test takes place as to whether the stationary torque existing in the new gear does not exceed a differential value (corresponding with the driving situation with regard to the stationary torque of the just selected gear), one can determine beforehand how the vehicle will continue to move after the shifting of gears has taken place; that is, whether in any case it continues to move with the speed present prior to the shifting of gears and with an economical fuel consumption.

The comparison between the transformed stationary drive torque and the maximum or achievable drive torque of a new gear position, permits a prediction of the resulting vehicle acceleration after the shifting process. In addition, it will predict the drive torque that can be expected after such gears have been shifted.

The term "motor characteristics" includes also those variables which indirectly describe the operational condition of the motor, such as numerical values for the fuel-injection times in relation to the rotational speed $n_A$ of the drive shaft of the motor and the motor momentum or torque.

Under the terms "torque" or "momentum", one is to understand drive data values or comparable data values which contain the drive torque as one factor, among others, which constitutes their makeup. Another factor, for example, may be a capacity value.

The invention will now be further described in conjunction with the attached drawings and graphs. In the drawings, like numerals have been used to designate identical parts throughout the several views.

FIG. 1 of the drawings shows, in a simplified representation, the essential elements of a commercial or utility-type vehicle driven by a driving engine. An internal combustion motor 6 serves as the driving engine, whereby its fuel supply can be controlled by way of a transmitter 1. Fuel transmitter 1 has been represented as a standard gas pedal, although other means are within the scope of the present invention. Via a drive shaft 8, the motor 6 is connected to a clutch 9 which, in turn, is connected to a transmission 12 via a shaft 11. The transmission 12 serves as the drive to an axle 14 which, in turn, drives the driven wheels of the vehicle. For simplification purposes, only one driven wheel 15 of the driven wheels of the vehicle is represented.

The transmitter 1, for control of the fuel supply of the motor 6, exhibits a fuel supply line or signal outlet 3, which is connected to a fuel supply line or signal inlet 5 of the motor 6 by way of a fuel supply or signal line 4. Furthermore, the transmitter 1 is equipped with a mechanism which represents the position of the transmitter 1 as command rate Y. This command rate Y can be fed from and recalled at a signal outlet 2 of the transmitter 1. As mentioned above in the most simplified case, the transmitter 1 contains a customary, mechanically-working gas pedal as the control element for the fuel supply of the motor 6. The fuel is preferably a hydrocarbon fuel, such as, gasoline or diesel fuel.

However, the transmitter 1, as in the represented operating example, can also be designed as an electrical or electronic transmitter if the motor 6 can be controlled by way of a control signal, for example.

The clutch 9, arranged between the drive shaft 8 on the driving side and the drive shaft 11 on the driven side, is operable by means of a control signal which can be fed to a signal inlet 10 of the clutch 9.

The transmission 12 can also be controlled electrically, whereby signal inlets 13 of the transmission 12 serve for the receipt of respective control signals for the selection and securing of the respective desired or required gear. The clutch 9 as well as the transmission 12 can, in the simplest case, be operated purely mechanically. In this case, the signal inlets 10 and 13 symbolically represent the connection of the clutch-operating mechanisms and the transmission-operating mechanisms for the clutch 9 and the transmission 12.

For control of the transmission 12, a transmission control 18 is provided. In the most simplified case, this transmission control 18 works in such a manner that the transmission 12, in relation to the rotational speed $n_R$ of the driven wheels, is shifted automatically. To detect the rotational speed $n_R$ of the driven wheel 15, a sensor 16 is used, whereby its rotational speed signal is fed to the transmission control 18 via a signal line 17 and connected to a signal inlet 19.

Via a signal outlet 22, the transmission control 18 is connected to the signal inlet 13 of the transmission 12 and it is connected to the signal inlet 10 of the clutch 9, the purposes of which will be explained in a detailed manner hereinafter.

If a new gear is selected and secured by way of the transmission control 18 in relationship to the speed of the vehicle and under consideration of specified selection criteria, the clutch 9 is operated by way of its signal inlet 10; and subsequently, at a separated clutch, the transmission 12 is shifted by the transmission control 18 via its signal inlet 13. After that, the clutch 9 is again engaged. The control or operation, respectively, of the clutch 9 and the transmission 12 can, as indicated above, also take place (as is known in the art) in a purely mechanical fashion via servomotors, and is contemplated to be covered by the present invention.

As a part of the aforementioned selection criteria—according to which in the transmission control 18 in each case a new gear is selected and secured—in the represented operating example is a check or test to determine if after securing of the basically selected new gear, a sufficient surplus torque or moment is available or an exactly measured momentum-drop or loss will not be exceeded.

For the comparison between the respective stationary torque $M_{stat}$ and the limiting line within the motor characteristic family of curves specified for the momentum-drop determination, a comparator 45 is provided which is integrated in the transmission control 18.

Also integrated in the transmission control 18 is an apparatus and a system which serves the purpose of storing and/or the mathematical determination of the values regarding the limiting line for the momentum-drop determination assigned to the individual gears of the transmission 12. It is logical that, in connection with the comparison of the torques as mentioned, the respective stationary torque is not directly compared to the suitable torque of the new gear in question, but that in this comparison the stationary torque is transformed according to the transformation ratio between the respective gear that is secured and the selected new gear to be secured. Therefore, in the represented operating example, $M'_{stat}$ is given as a value of a comparison instead of $M_{stat}$. Of course, it is also possible to compare—instead of the stationary torques or the transformed values according to the transformation ratio of the transmission—other values derived from the torques; such as, for example, forces, performances, or such values of comparison which the torques may merely contain as one or more operands.

In the comparator 45 for the gear just driven, a limiting line for the moments measurement is stored. For example, the range of moments for the stationary torque $M_{stat}<400$ is coordinated with a rotational speed range $n=1500 \div 1600$. This coordination, according to the present invention, in the individual case, desired torque-reserve can of course also be determined with other values, or can be arranged variably by the available driving conditions in each case.

The comparison is then carried out in such a manner that, first it is being examined to determine if the actual rotational speed of the motor falls into the range of the stored table values for n, for example $n=1500 \div 1600$. Subsequently, it is being examined to determine if the constant speed drive torque falls into the range of moments or torques according to the table, coordinated with the rotational speed, for example $M_{stat}<400$. If this criterion is fulfilled, a signal is given to the blocking device 48 (UND-member) via the signal line 47.

The blocking device 48, used in this arrangement of the apparatus for this invention, is a customary UND-member which passes on a signal that is generated by a shifting signal transmitter 52 via a line 50 to gear-shifting control 49 whenever, at the same time, a signal is also present on the line 47.

A comparator 46 works in an identical manner, whereby here however the stationary torque $M_{stat}$ for a gear that is to become the newly selected gear is compared with the table values. If the criteria established is fulfilled, a signal is passed on to the blocking device 48 via a signal line 51.

As demonstrated with a point 53 on the blocking device 48, the signal of the comparator 46 is, however, being ignored at the inlet of the blocking device 48, so that a signal from the shifting signal transmitter 52 to the gear-shifting control 49 is allowed to pass whenever the signal is not present on the line 51 from the comparator 46.

All the data values of the limiting line for the momentum-giving determination, which are stored in both of the comparators 45 and 46, always refer to the values deposited in the family of curves stored in memory storage device 36.

For the computation or determination of the stationary torque $M_{stat}$ or a constant speed drive torque derived from that, a momentum control system 24 is provided which passes the stationary torque $M_{stat}$, required for the aforementioned comparison, by way of a signal line 21 to the transmission control 18, provided the transmission control 18 obtains the respective value by way of an inquiry-signal line 20. Thus, it is ensured for all practical purposes, that the transmission control 18, after the selection of one or more basically permissible new gears—according to the rotational speed $n_R$ of the driven wheel 15—for each one of these gears, carries out the comparison between the required constant speed drive torque $M_{stat}$ and the torque measured in optimum manner for the new gear in question. The result of this comparison then is that, for example, the new gear with the most favorable fuel consumption is selected which, in any case, drives the vehicle in such a way that it continues on without any significant slowdowns; or that no new gear is secured because in none of the selected new gears can a continuation of the vehicle be achieved without significant slowdown.

In the momentum control system 24, the respective stationary torque $M_{stat}$ is determined in a way whereby the differential between the respective instantaneous drive torque $M_A$ of the vehicle—actually generated by the motor 6—and such an operand is determined, which results as the product of the weight of the vehicle and the mathematical value of the instantaneous acceleration of the vehicle. In order to be able to compute the aforementioned differential, the transformed instantaneous drive torque $M_A$ signal 34 of the motor 6 is transmitted to the momentum control system 24 via a signal inlet 27; the signal 29 representing the weight G of the vehicle is transmitted via a signal inlet 26, and the rotational speed $n_R$ signal 17 of the driven wheel 15 is passed on to said momentum control system 24 by way of a signal inlet 25.

The signal inlet 27 of the momentum control system 24 is connected to the signal outlet 35 of a motor-family of characteristic curves memory storage device 36; this takes place via a line 34. The memory storage device 36 for the family of characteristic curves, with regard to the motor 6, provides a signal that matches an instantaneous drive torque $M_A$ of the motor 6.

The signal inlet 26 of the momentum control system 24, is connected to an evaluation and computation system 30 for determination of the weight of the vehicle. On the signal line 29, a signal is available which corresponds with the weight of the vehicle.

Additionally, the signal inlet 25 of the momentum control system 24, via the signal line 17, is connected with the sensor 16, for example a tachometer, to determine the rotational speed $n_R$ of the driven wheel 15. In the momentum control system 24, the acceleration value $\ddot{s}$ is computed from the time slope of the rotational speed $n_R$ of the driven wheel 15 by way of differentiation.

The respective instantaneous torque $M_A$ of the motor 6 is ascertained from the motor-family of characteristic curves in memory storage device 36, which includes the dependency of the following values to each other: instantaneous torque $M_A$ of the motor 6, rotational speed $n_A$ of the motor 6, and position Y of the transmitter 1 (gas pedal). In the represented operating example, the memory storage device 36 for different values ($Y_1$, $Y_2$, $Y_3$) of the position Y of the transmitter 1 contains one characteristic curve each for the dependency of the instantaneous torque $M_A$ with regard to the rotational speed $n_A$.

The position Y of the transmitter 1 is passed on to the signal inlet 39 of the memory storage device 36 via a signal line 40 which, in turn, is connected to the signal outlet 2 of the transmitter 1. The rotational speed $n_A$ of the motor 6 is ascertained by means of a sensor 7 which explores, or probes, the drive shaft 8 and is then passed on to signal inlet 37 of the memory storage device 36 via a signal line 38. The memory storage device 36 for characteristic curves is designed in such a manner that, for each value-pair $Y/n_A$, it makes available the instantaneous torque $M_A$ on its signal outlet 35.

The rotational speed $n_A$ of the motor 6, as contemplated by this invention, can also be calculated from the rotational speed $n_R$ of the driven wheel 15, if the respective transformation ratio of the transmission 12 is taken into consideration during such calculation.

The weight-determination device 30 for the weight G of the vehicle is the same as disclosed and claimed in my earlier copending application, and is presently preferred in the practice of this invention. In that case, for such determination of the Weight G of the vehicle, the ratio between the instantaneous torque $M_A$ of the motor 6 and a differential of two operands is formulated, whereby the operands listed in each case contain an acceleration value matching the acceleration of the vehicle. These two acceleration values $\ddot{s}_{x2}$ and $\ddot{s}_{x1}$ are determined at different times, whereby the one acceleration value is determined at an instance in which the vehicle is in a power-off condition; for example, during a shifting interval. In this power-off condition, the vehicle is neither essentially being accelerated nor is it being decelerated. In order to be able to carry out the computing operation as indicated, the instantaneous torque $M_A$ of the motor 6 is supplied to the weight-determination device 30 via the signal line 34 and a signal inlet 33 of weight-computation device 30. The time for the formulation of the acceleration values $\ddot{s}_{x2}$ and $\ddot{s}_{x1}$ is the necessary time slope of the rotational speed $n_R$ of the driven wheel 15, which is passed on to a signal inlet 32 of the weight-determination and computing device 30 via the signal line 17. Via a signal line 23, the instance in which the clutch 9 is separated is made known to a signal inlet 31 of the weight-determination device 30. With that, a distinction is made between such times in which the vehicle is subject to the drive by way of the motor 6, and those times in which the vehicle is not subject to the drive of the motor 6. At these different times, the acceleration values $\ddot{s}_{x2}$ and $\ddot{s}_{x1}$ are also measured or determined.

The general equation for the determination of the vehicle weight G is as follows:

$$G \approx \frac{M_{A1} - M_{A2}}{f(\ddot{s}_{x1}) - f(\ddot{s}_{x2})}$$

Values with index 1 are determined at instance 1, and values with index 2 are determined at instance 2.

Aside from the special case $M_{A2}=0$ (as described above) which is valid for the shifting interval, the special case $f(\ddot{s}_{x2})=0$ can also be evaluated. This is valid for non-accelerated driving.

The above equation of course can also be evaluated in general, without waiting for the special cases. In doing so, however, one must always pay attention to the fact that both of the measuring points are not located too far apart. However, in order to obtain a sufficient accuracy for the weight value, the differential of the torques $M_{A1}-M_{A2}$ should be selected to be as great as possible.

The weight-determination device 30 can also be designed in such a way that different ascertained weight values can be utilized to formulate a medium or average value for the weight values; and that the thus determined average value of the weight values, in turn, is employed for the indicator or determination of the weight G of the vehicle. In this case, the momentum-control system 24 is provided with a weight-medium value.

Means can also be provided which only allows such weight values, or medium values of the weight values, to be evaluated that do not exceed a specified deviation from a specified value or an earlier determined value of the weight value.

To assure that in the momentum-control system 24 a usable value for the stationary torque $M_{stat}$ can be determined, even if in the weight-evaluating system device 30 no sufficiently accurate value for the weight value G is available due to a driving time that has been too brief for example; it is advantageous to initially use a medium weight value $G_O$ instead of the calculated weight value G, determined by the weight-evaluating system device 30. In many cases, for example, such weight $G_O$ matches a half-loaded vehicle.

For a reliable determination and computation of the weight value G, a microcomputer is provided in the weight-determination device 30 and with which, in particular, also the time-related calculations regarding the acceleration values can be realized in a simple way. The microcomputer is thus suitably used in an advantageous manner.

Figure 2:
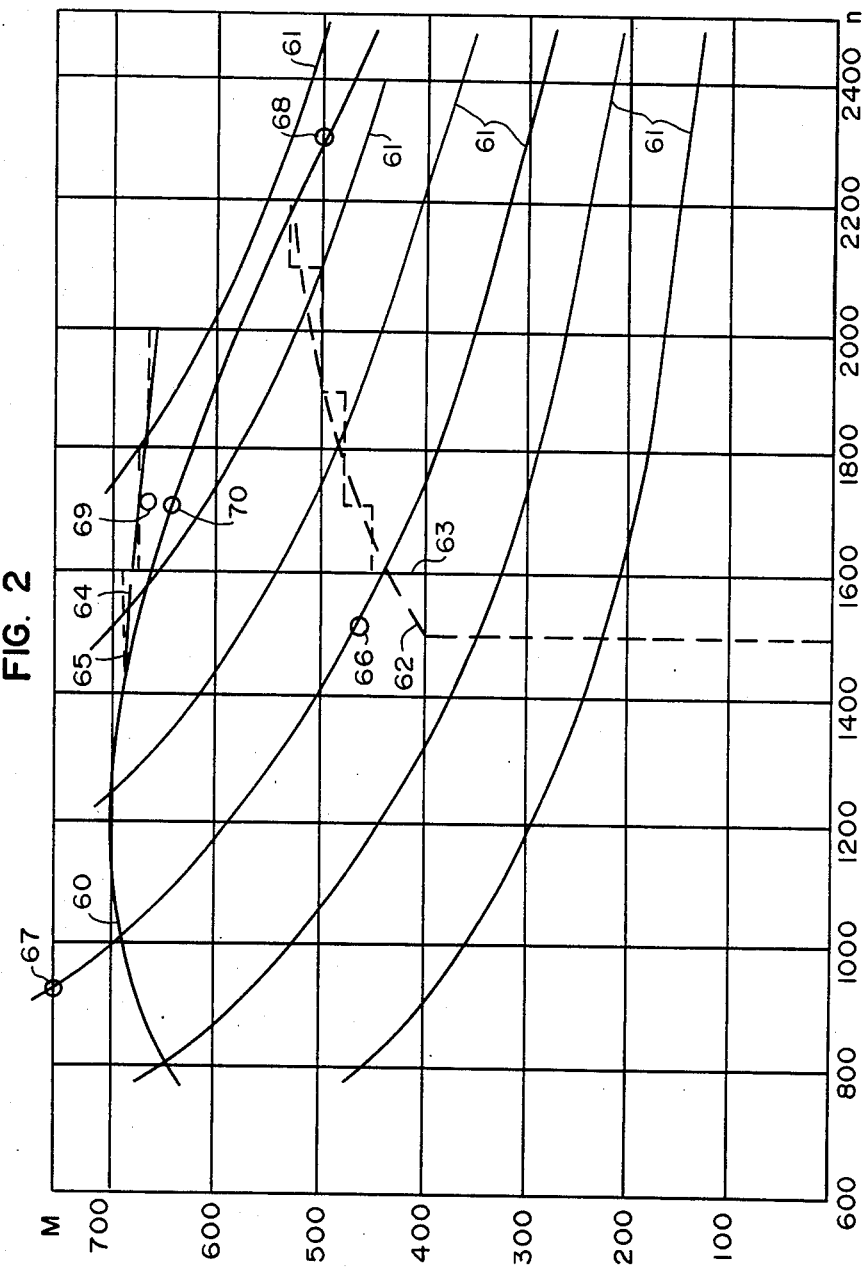
FIG. 2 is a graph showing a customary motor-family of curves, used in the embodiment of FIG. 1, correlating motor torque with motor RPM.

The graph diagram, represented in FIG. 2, shows a customary motor-family of characteristic curves. In the diagram, the line 60 shows the path of the maximum torque of the motor 6 with respect to a diesel motor at diversified rotational speeds $n_A$ of the motor 6. The auxiliary lines 61 are hyperbolas and merely serve the purpose of illustrating where the operating point of the motor travels to if another one is selected as the just-driven transmission transformation. The lines 62 and 64 are the limiting lines, specified according to prescribed criteria, with which the stationary torque $M_{stat}$ is compared. The graduated lines 63 and 65 serve the simulation of the lines 62 and 64.

If, for example, it is assumed that the motor 6 would be driven within the operating point 66, then the rotational speed $n_A$ of the motor 6 in the next highest gear (operating point 67), in the assumed case, would then be located lower at n=600, and also at n=900.

If one wishes to achieve the same stationary torque in the next highest gear, the new motor operating point would travel along the hyperbola 61 into the operating point 67. This means that, in connection with the shifting to this gear, one has to anticipate a drop in performance. If this is not acceptable, a shifting must be blocked if the old motor operating point 66 is positioned above the empirically determined line 62. This is the case with the example presented.

The line 62 (as in the case which is represented) can now be fixed in such a manner that, upon shifting to a higher gear, at least the stationary torque $M_{stat}$ is still available, which is present in the driven gear. The line 62, however, can also exhibit another position and another path after the most diversified requirements, or also can be shifted in direct relation to driving parameters. Thus, for example, it may be advantageous to carry out a shifting of the limiting line 62 for the best performance-giving determination to higher rotational speed $n_A$ of the motor torque whenever one must drive on a steeper gradient, particularly if the loading condition of the vehicle exceeds a predetermined fixed value, or it is possible also to move the line 62—relative to a driving program to be selected by the driver of the vehicle—to higher rotational speed $n_A$ of the motor 6 and smaller motor-torques, and thus provide more torque and enable a smoother driving manner.

In a similar manner, a limiting line 64 can be fixed, with which the stationary torque $M'_{stat}$ is compared in the higher gear, and which lies above the maximum torque line 60. If, for example, the motor 6 is driven in point 68, the expected fuel consumption will be relatively high, since the motor 6 is running at a very high speed. The operating point in the next highest gear, for example, would be located within point 69; in other words, above the maximum torque line 60. It would drop to the point 70 upon shifting. This means a slight torque loss which, however, would be acceptable in the case represented due to the fact that a lower fuel consumption would result from such operation.

The limiting line 64 for the momentum-giving determination—in the represented case—is fixed in such a way that, during shifting to a higher gear, a slight torque loss occurs, but this results in a significantly better fuel consumption.

From the description of the procedures in the graphical diagram, one can conclude that the performance-giving determination must take place in a very precise manner if one is to prevent faulty shifting. The special advantage of the proposed shifting lies in the fact that it is possible for most all of the operating points which are being determined to fall within the same diagram. If, for example, the starting-torque-values of the line 60, listed in the diagram for the maximum motor-moments, would not be reached by the motor 6 due to some type of outside influence or should it be smaller by a certain factor, this factor would also be valid for all remaining—among other things, also for the operating points 66, 67, 68, 69 and 70. This, however, then means that the relationship of the operating points 66, 67, 68, 69 and 70 to the line 60 of the maximum moments or torques would remain and comparators 45 and 46 would yield a flawless, usable result.

Figure 3:
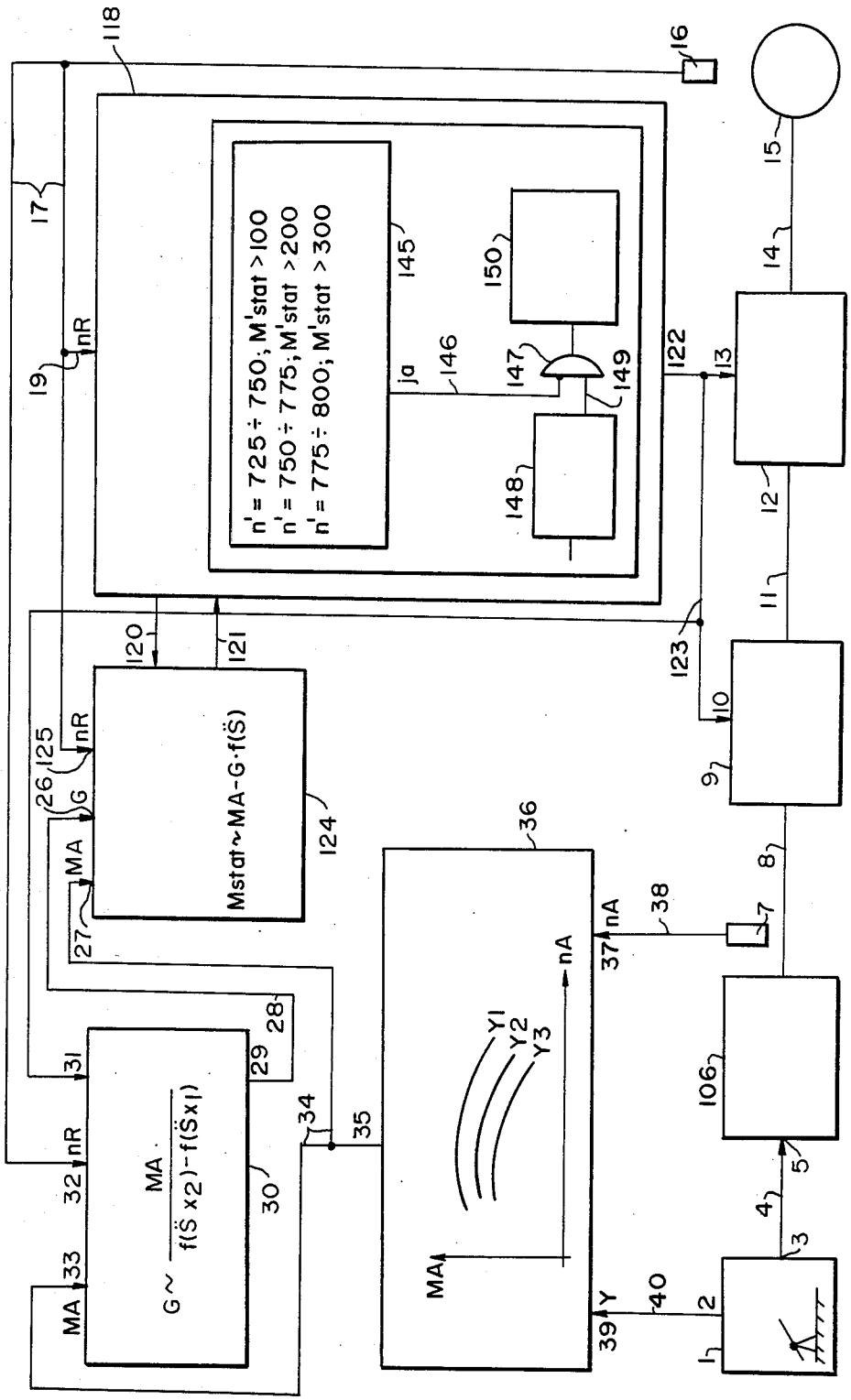
FIG. 3 is a schematic diagram showing the essential elements of an alternative embodiment of the invention.

Now reference is made to an alternative embodiment, illustrated in FIG. 3, which shows in simplified depiction, the most important aspects of the vehicle driven by a motor. This drive system consists of an internal combustion engine 106, with a fuel supply line 4, which is controllable by means of a fuel supply feeder 1. Motor 106 is connected by means of a drive shaft 8 with a clutch 9 which, in turn, is connected to a transmission 12 by means of a shaft 11. Transmission 12 drives shaft 14 which, in turn, drives the traveling wheels 15 of the vehicle. Only one driven wheel 15 has been shown to simplify the illustration. Fuel supply feeder 1, for controlling the fuel intake of the motor 106, shows a fuel outlet or signal channel 3, which is connected through fuel or signal line 4 to fuel or signal receiver 5 of motor 106. Fuel supply feeder 1 is also equipped with a device which shows the position of fuel supply feeder 1 as signal entity Y. This signal entity Y can be activated at a fed-from and recalled-at signal connection 2 of fuel supply feeder 1. In the simplest case, the fuel supply feeder is a control member for the fuel supply of the motor 106 in the form of a mechanically-activated gas pedal. Fuel supply feeder 1 can also be designed for an electrical or electronic control, as shown in the illustration, whenever the motor 6 can be controlled by means of a control signal.

The clutch 9 between drive shaft 8 and driven shaft 11 can be activated by means of a control signal 123, which is received through a signal entry 10 of clutch 9.

Transmission 12 can also be controlled electrically, whereby signal entries 13 of transmission 12 are used for receiving the control signals 123 for shifting into the selected desired or required gear. Clutch 9, as well as the transmission 12, can be operated mechanically. In such case, signal entries 10 and 13 signify the connection of the clutch mechanism and the transmission mechanism with the respective activating devices for the clutch 9 and the transmission 12.

To control transmission 12, a gear transmission control device is used. This transmission control device 118 operates in such a way, that the transmission 12 will be activated automatically in relation to the vehicle speed, and thus in relation to the RPM $n_R$ of the driven wheel 15. To record the RPM $n_R$ of the driven wheel 15, a sensor 16, such as a tachometer may be used; the RPM signal is transmitted over line 17 to a signal entry 119 of transmission control 118. Transmission control 118 is connected through signal exit 122 and lines 123 with signal entries 13 of transmission 12 and signal entry 10 of clutch 9.

When a new gear position is determined by means of transmission control 118, in relation to the vehicle velocity and under consideration of predetermined criteria, the clutch 9 is activated by way of signal entry 10 and switched with disengaged clutch 9 over entry 13 by transmission control 118. The clutch 9 is then reengaged. The control or activating of clutch 9 and transmission 12 can occur mechanically by means of servo-drives of transmission 118, as described above.

In addition to the above criteria, which is used to determine a new position in the transmission control 118, a test can be conducted to determine if the motor 106 is capable to produce the required drive torque without any deceleration, after the gears have been shifted to the new position. This means that the drive torque range for the selected gear position must be larger than the constant speed drive torque $M_{stat}$, which is required for a continuous vehicle operation without deceleration.

For this comparison between the stationary drive torque $M_{stat}$ and the selected new maximum torque (e.g., by remaining below the permissible rotational force), a comparative device 145 has been added, which was integrated into the transmission control 118. Also integrated into the transmission control 118 is a device which records the values for the maximum drive torque and the rotational force limit. It is understood that with this comparison of drive torques, the respective stationary torque is not directly compared with the drive torque of the new gear position, but to cause a transformation between the old and the new position of the gear transmission. For this reason, the given example shows $M'_{stat}$ instead of $M_{stat}$. It is also possible to compare derivative data, such as forces, and output or data which list the drive torque only as one of several data, instead of the stationary drive torque and the values obtained by the respective gear ratio.

The comparative device 145 shows the data for the maximum drive torque and the rotational force in relation to given RPM factors. A torque of 100 is hereby related to an RPM of $n' = 725 \div 750$. The comparison is made by testing the RPM range $n'$ which lies within the new position, which is then compared with the maximum torque of the stationary drive torque of the new gear position $M'_{stat}$, such as $M'_{stat} > 100$. If the criteria is fulfilled, a blocking signal is issued over line 146 to a blocking element 147. A switch signal-giver 148 will then issue—over signal line 149—a signal to gearshift control 150 in blocking element 147, thereby preventing any further switching into any other gear position.

All values for maximum drive torques and the rotational force recorded by the comparative device 145 will be related to the values recorded in the field memory storage device 36.

For calculating or determining the constant speed drive torque or a derivative drive factor, a torque or momentum-control device 124 has been added to supply the data necessary for comparison of the respective stationary drive force (e.g., $M_{stat}$ or $M'_{stat}$) over signal lines 121 to transmission control 118, provided that the transmission control 118 requests the respective data by way of signal line 120.

This will assure, in the majority of cases, that the gear transmission control 118 will select a torque suitable to the RPM $n_R$ of the driven wheel 15, in relation to the required stationary drive torque and the torque required for the newly selected gear ratio. In return, this will help achieve a selection of the most advantageous ratio, so that the vehicle will have the ability to continue without noticeable deceleration, or no gears will be shifted because otherwise a continued speed of the vehicle cannot be assured without deceleration.

The torque control device 124 defines the stationary drive torque $M_{stat}$ by determining the difference between the momentary drive torque $M_A$ of the motor 106, and a calculated figure derived from the product of the vehicle weight G and the calculated vehicle acceleration. To determine this difference, the torque control device 124 will receive a signal from a signal line 34 at a signal inlet 27 that represents the transformed momentary drive torque $M_A$ of the motor 106; and from a signal line 28 at signal inlet 26, the weight G of the vehicle, with RPM $n_R$ of the driven wheel 15 by way of signal line 17 into signal inlet 125.

Signal inlet 27 of the torque control device 124 is connected by means of a signal outlet 35 of a motor data memory storage device 36, which will issue an appropriate signal at signal outlet 35 for the momentary drive torque of the motor 106. The signal inlet 26 of torque control device 124 is connected through a signal line 28 with signal outlet 29 of a weight-evaluation and computing device 30 for the determination of the vehicle weight G. This signal outlet 29 of the weight-evaluation and computing device 30 has a signal at its disposal, which corresponds to the weight G of the vehicle. The signal inlet 125 of the torque control device 124 is connected through signal line 17 with the RPM or sensor 16 to determine driven wheel 15 RPM $n_R$. The torque control device 124 determine $M_{stat}$ by differentiation of the time span for RPM $n_R$ of the driven wheel 15 for vehicle acceleration $\ddot{s}$. The momentary drive torque $M_A$ of the motor 106 is determined from a motor characteristics graph in memory storage device 36, which contains the following data and its interrelationship: the momentary drive torque $M_A$ of motor 106, the RPM $n_A$ of the motor 106, and the position Y of the fuel supply device 1 (gas pedal).

The illustration shown contains a number of curves in the memory storage device 36 for various values ($Y_1$, $Y_2$, $Y_3$) of the position Y of fuel supply device 1 with an identification line for each relationship of the momentary drive torque $M_A$ from RPM $n_A$.

The position Y of fuel supply device 1 is entered through a signal line 40 into connection at signal inlet 39 of memory storage device 36 which, in turn, is connected to signal-outlet-and-recall 2 of fuel supply device 1.

The RPM $n_A$ of the motor 106 is determined by sensor or probe 7, which checks or probes shaft 8 and transmits such RPMs by way of signal line 38 to signal inlet 37 of memory storage device 36. The memory storage device 36 is designed in such a way that for each value set $Y/n_A$, the momentary drive torque $M_A$ is available at its signal exit point 35. The RPM $n_A$ of the motor can also be determined from the driven wheel RPM $n_R$ of driven wheel 15 when the respective transmission ratio of gear 12 is taken into consideration.

For determining the weight G of the vehicle, the ratio between the momentary drive torque $M_A$ of the motor and a differential between two entities is formed, whereby the calculated data contains an acceleration factor which corresponds to the acceleration of the vehicle. The two acceleration factors $\ddot{s}_{x2}$ and $\ddot{s}_{x1}$ are determined at different times, whereby one acceleration factor is established at a time when the vehicle is being driven by the motor 106; and the other acceleration factor is determined at a time when the vehicle is not driven, such as a transition between shifting points. During this driveless condition, the vehicle will not be accelerated or decelerated to any great extent.

In order to complete these operations, the weight-determination is processed by supplying a signal through signal line 34, whereby the momentary drive torque $M_A$ of the motor 106 is fed into signal inlet 33 of weight-calculation device 30. The time required for generating the acceleration data $\ddot{s}_{x2}$ and $\ddot{s}_{x1}$, in relation to RPM $n_R$ of the driven wheel 15, is transmitted to the weight-calculation device 30 through signal line 17 to a signal inlet 32 and used for weight-determination. By way of signal lines 123, a signal is received at signal inlet 31 of the weight-calculating device 30, which is representative of the time at which coupling in clutch 9 has been disengaged by a control signal from the transmission control 118. In this way, a differentiation can be made in the weight-determination and calculating device 30 for and between the times when the vehicle is driven by the motor 106, and those times during which the vehicle is not being driven by the motor 106. For these different time periods, the acceleration data $\ddot{s}_{x2}$ and $\ddot{s}_{x1}$ will also be measured or determined.

The general formula for determining the vehicle weight G is as follows:

$$G \approx \frac{M_{A1} - M_{A2}}{f(\ddot{s}_{x1}) - f(\ddot{s}_{x2})}$$

Values with index 1 are determined at time 1, and values with index 2 are determined at time 2. In addition to the above-described special case $M_A = 0$, which applies to the time period between shifting positions, the special case $f(\ddot{s}_{x2}) = 0$ can be used. This case applies to non-accelerated speeds.

The above formula can also be used for general cases, without waiting for special cases. Care should be taken, however, that the two measuring points are not too far apart. To obtain a sufficient accuracy for the weight-determination, the differential between drive torques $M_{A1} - M_{A2}$ should be as large as possible.

The weight-determination in weight-calculating device 30 can be made in such a way that different weight G factors are used to arrive at a medium weight, and that this medium value is used for determining the weight G of the vehicle. In this case, the torque control device 124 will receive a medium weight G factor.

It is possible to use only those weights G, or average weights, which do not deviate from a predetermined value or a value entered for this specific purpose.

To assure that even in the evaluating process in weight-determination device 30, a usable value for the weight G determination is present—even if the actual time is very short—and in order to determine a usable value for the torque control device 124 for the stationary drive torque $M_{stat}$, it is advantageous to use a medium weight $G_O$ instead of weight G, determined by the weight-determination device 30, as the average weight corresponds more to a half-laden vehicle.

For a safe determination and calculation of weight G, it is advantageous to employ a microcomputer for the calculation of the weight in the weight-determination device 30, whereby time-related calculations of acceleration factors can easily be made.

Figure 4:
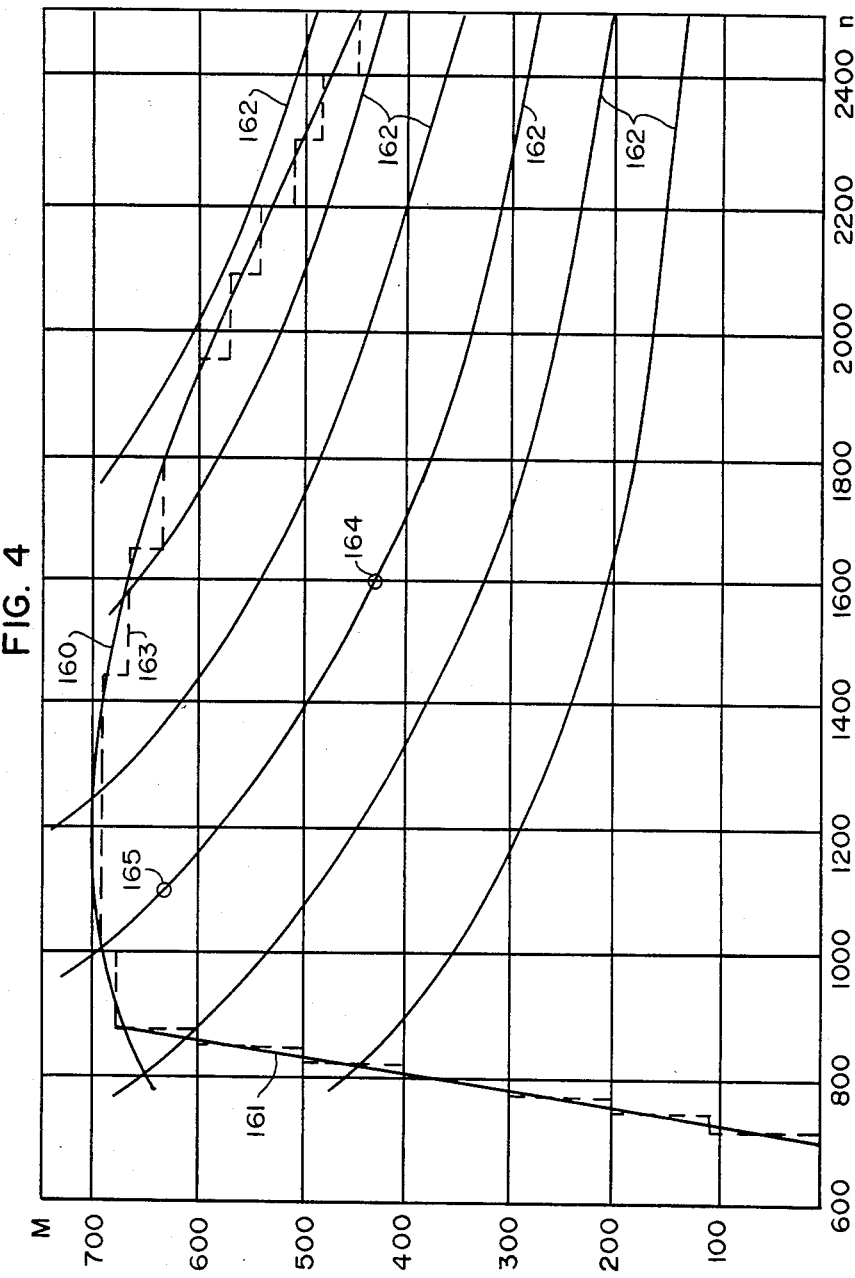
FIG. 4 is a graph showing a customary motor-family of curves, used in the embodiment of FIG. 3, correlating motor torque with motor RPM.

The graph diagram, shown in FIG. 4, represents a typical plotting of a line 160 for the maximum starting torque, superimposed over the motor RPM of a motor which, in this case, is a diesel engine 106.

Line 161 limits the field for possible motor operating points to lower RPM values. It is also referred to as a drive shaft rotational limit, below which the motor 106 does not operate without vibrations. The auxiliary lines 162 are hyperbolas and should show the direction into which the motor 106 operating point is drifting, while another will be used to indicate the straight gear ratio. The dotted lines 163 should give a simplified depiction of the curves generated for control signals.

It is assumed that the momentary motor operating point 164 is available. It is further assumed that because of the present transmission 12, when shifting into the next higher gear, a differential RPM of 500 will result. The new motor 106 operating point would then lie on the same hyperbola at point 165, under the assumption that the same drive speed is to be continued. For this new motor 106 operating point 165, it will be examined to determine if this point is above or below line 163 before shifting into a new gear or issuing the command to shift. This examination will be done by the comparative device 145 with transmission control 118.

If this point 165 is below line 163, as shown in the diagram for the purpose of illustration, the transmission can be shifted into the newly selected gear. If, however, point 165 for the selected new gear is above line 163, the transmission will not be shifted into such new gear.

The specific advantage to the use of operating point comparisons with maximum characteristic lines lies in the fact that operating points 164 and 165, and the points on line 163 are part of the same diagram. If, for example, the start-up torque of line 160 on the diagram for the maximum motor torque cannot be reached by the motor 106 for any given reason and if they are somewhat smaller, this factor would also apply to all other points, especially for operating points 164 and 165. This would mean, however, that the relationship of operating points 164 and 165 to line 160 of the maximum torque would remain constant, and the comparison control device 145 can provide a substantially error-free and usable result.

Figure 5:
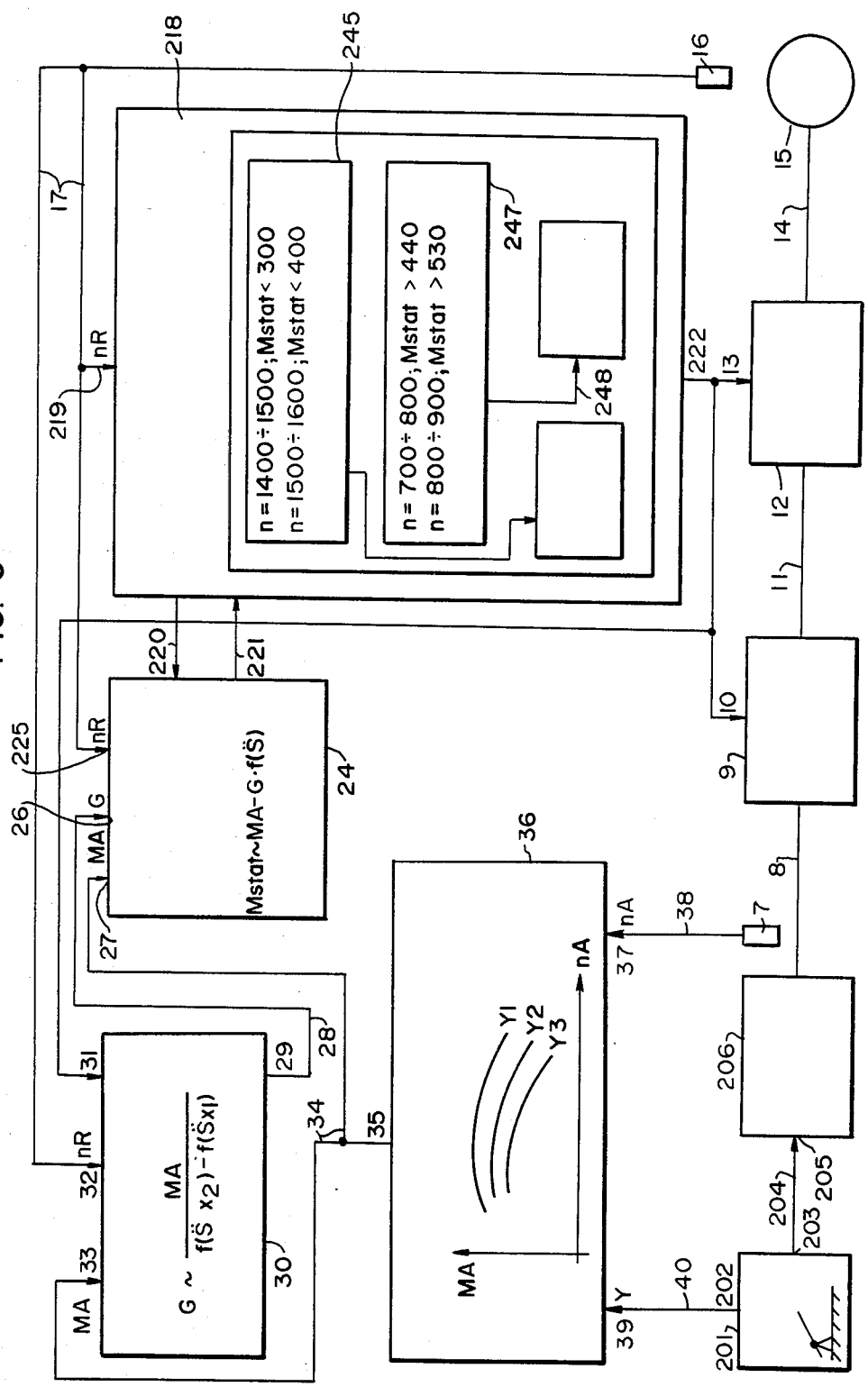
FIG. 5 is a schematic diagram showing the essential elements of another alternative embodiment of the invention.

Reference will now be made to FIG. 5 of the drawings, which shows another alternative embodiment of a simplified version of the basic elements of the drive train of a motor vehicle. This drive train uses an internal combustion motor 206, which is controlled by a fuel supply source such as a generator 201. By means of a drive shaft 8, the motor 206 is connected with a clutch 9 which is, in turn, connected to a gear transmission 12 by way of a shaft 11.

The transmission 12 drives an axle 14 which, in turn, drives the wheels 15 of the vehicle. In FIG. 5, only one driven wheel 15 is shown for the purpose of simplification.

The fuel supply generator 201, for controlling the amount of fuel supplied to the motor 206, has a fuel supply signal connection 203 which is connected through line 204 to the terminal 205 of the motor 206. Fuel supply generator 201 is equipped with a device to simulate the position of the fuel supply generator 201 as a signal entity Y. This entity Y can be fed from, and recalled, by means of signal terminal 202 of the fuel supply generator 201. In the simplest case, fuel supply generator 201 uses a common mechanical gas pedal for supplying the fuel to the motor 206. The fuel supply generator 201 can also, as shown in this embodiment of the invention, be activated electrically or electronically when the motor is, or can be, controlled by means of an electrical control signal.

The clutch 9, positioned between drive shaft 8 and driven shaft 11, can be activated by means of a control signal 223 which is connected to a signal inlet terminal 10 of clutch 9.

Transmission 12 can also be controlled electrically, whereby signals entering signal inlet terminals 13 of the transmission 12, serve as control signals for shifting or maintaining the transmission 12 at the desired gear position. Clutch 9, as well as transmission 12, can also be operated mechanically if desired. In such a case, signal inlet terminal 10 in clutch 9 and signal inlet terminal 13 in transmission 12 signify the clutch 9 and transmission 12 gear activation mechanisms with the respective controls for the clutch 9 and the transmission 12.

The control of gear transmission 12 is provided by transmission gear control device 218. In the simplest case, this control device 218 assures that gear transmission 12 can be shifted in relation to the speed of the vehicle, and thus the RPM $n_R$ of the driven wheel 15. To determine the RPM $n_R$ of driven wheel 15, a sensor 16, such as a tachometer, is used which emits a signal representing the RPM value or figure through signal line 17, into a signal entry terminal 219 of transmission gear control 218. A signal exit terminal 222 and signal lines 223 connect the transmission gear control device 218 with signal entry terminals 13 of transmission gear 12 and signal entry terminal 10 of clutch 9.

If a new gear ratio is required in transmission 12, clutch 9 is activated to disengage via a signal 223 at signal entry terminal 10, and transmission 12 can be shifted with disengaged clutch 9 via signal 223 at signal entry terminal 13; such signals being supplied from transmission control device 218. After shifting, the clutch 9 will then be engaged again. Clutch 9 activation, as well as the gear shift of transmission 12, can also be accomplished mechanically by way of servomotors of transmission gear control device 218.

The above-mentioned numerous criteria, which are used for gear selection to achieve good performance of the vehicle that is consistent with good fuel economy, is examined to assure a position of the selected transmission gear ratio within the most advantageous operational limits.

For a comparison of the stationary torque $M_{stat}$ with the selected gear, a comparison device 245 is provided, into which transmission gear control device 218 is integrated. Transmission gear control device 218 also contains the values for the most advantageous vehicle operation. For such comparison, the stationary torque will not be compared directly with the drive torque of the respective newly selected gear, but instead the stationary torque will be transformed according to the gear ratio between the selected new position and the previous gear position. For this reason, the drawing shows $M'_{stat}$ instead of $M_{stat}$. For such comparative analysis, it is also possible to utilize other factors; such as, forces, and output or data which contain the drive torque as one of several factors, and such is contemplated to be covered by this invention. The comparison device 245 in the transmission control device 218 contains the parameters for the economic fuel consumption within the respective RPM. Thus, 20 the stationary torque $M_{stat} < 300$ is used with an RPM of $n = 1400 \div 1500$. The comparison considers the actual RPM in the table for n, such as $n = 1400 \div 1500$. It will then be tested or checked to determine if the stationary torque falls into the torque range of the respective RPM, such as $M_{stat} < 300$. If, and when, this condition is fulfilled, a signal will be given through line 246 to shift into the next higher position.

Another comparative device 247 in transmission control device 218 will also issue a signal 248 for shifting into a lower gear when the respective conditions are fulfilled. All data stored in comparison devices 245 and 247 relate to the data stored in memory storage device 36.

For calculating or determining the stationary torque or related factor, a torque control unit 24 is provided to check on the stationary drive factors necessary for the comparison (e.g. $M_{stat}$ or $M'_{stat}$) which are sent through signal lines 221 to transmission gear control device 218, if transmission control device 218 should request such data through signal line 220. This assures that transmission gear control device 218 will select the new gear position according to the respective RPM $n_R$ of the driven wheel 15. The result of this comparison is the most advantageous gear to permit the vehicle to proceed without deceleration after shifting, and with consistent good fuel economy.

The torque control device 24 determines the stationary torque $M_{stat}$ by adjusting the motor torque between the momentary torque MA to the product of weight and momentary acceleration of the vehicle. The differential is determined by entering the transformed momentary torque $M_A$ into torque control device 24 of motor 206 through signal entry terminal 27; and the weight G of the vehicle by way of signal entry terminal 26, with RPM $n_R$ through signal entry terminal 25, as observed at driven wheel 15. Signal entry terminal 27 of torque control device 24 is connected through signal line 34 to a signal exit 35 of motor data field memory storage device 36, which transmits the momentary torque of the motor 206 to signal exit 35 for transmission. Signal terminal 26 of torque control device 24 is connected to a weight-determination and calculating unit 30 through signal line outlet 29 for receiving the vehicle weight G. The weight-determination and evaluating unit 30 transmits the vehicle weight G through signal line 28. Signal entry 225 of torque control device 24 will be connected through signal line 17 with sensor or tachometer generator 16 to determine driven wheel 15 RPM $n_R$. Torque control device 24 will differentiate the time factors for the RPM $n_R$ of driven wheel 15 with acceleration s̈ of the vehicle. The momentary torque $M_A$ of the motor 6 is taken from the motor characteristic field stored in memory storage device 36 which operates, as described previously, in conjunction with FIGS. 1 and 3.

Figure 6:
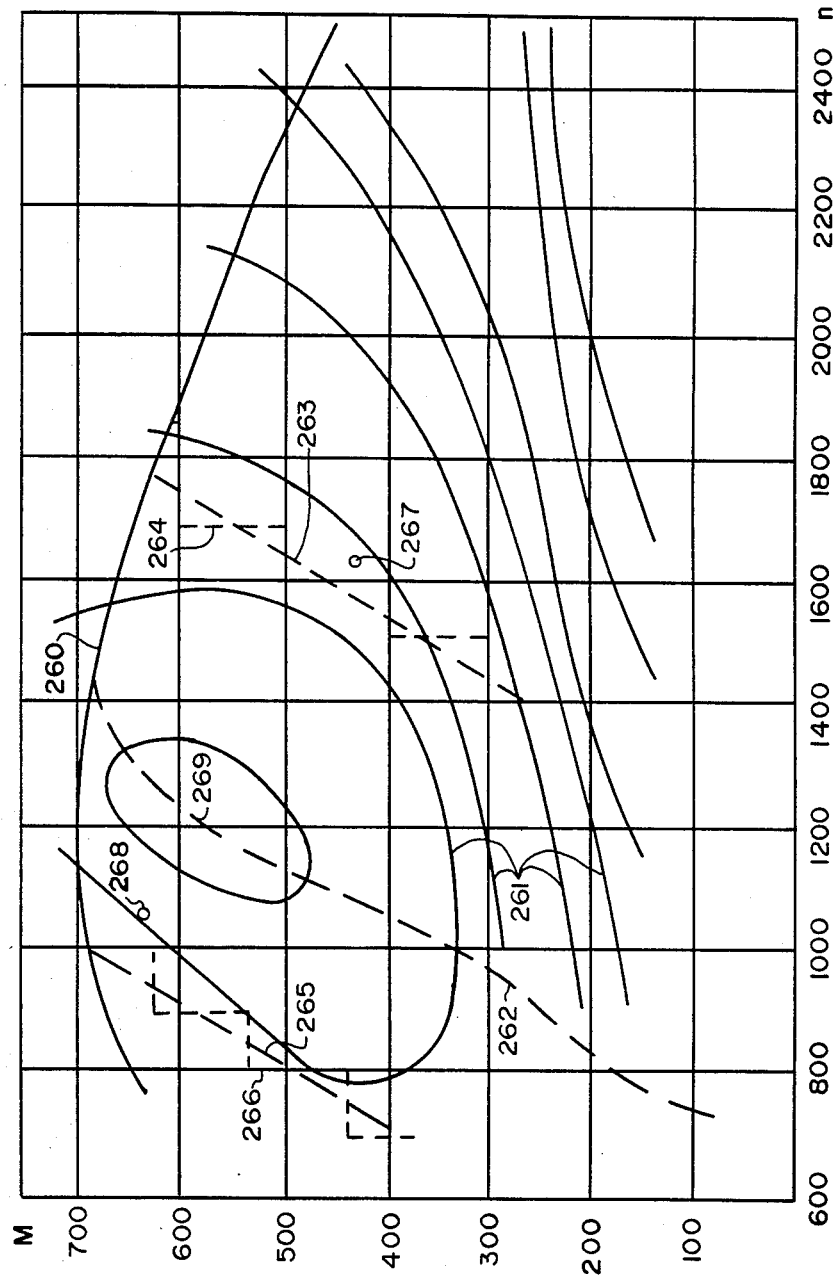
FIG. 6 is a graph showing a customary motor-family of curves, used in the embodiment of FIG. 5, correlating motor torque with motor RPM.

The graph diagram in FIG. 6 shows line 260 for a diesel engine with maximum torque (full speed) for various RPMs.

Lines 261 show the specific power consumption, whereby point 269 designates the point of smallest specific fuel consumption. With increasing distance from point 269, lines 261 show an increasing fuel consumption. The lines can be established by conventional measuring means. If one were to seek the point of the smallest fuel consumption for the given RPM, line 262 can be used with an RPM of 1400, which glides into line 260. The operating point of the motor 206 should be as close to line 262 as is practical or possible.

With step-type gears, this may not always be possible. The points for this type transmission may well lie between two gear positions. Line 263 shows a typical gear example. If the point of operation shifts to a higher RPM to a point to the right of line 263, such as point 267, such higher gear would lie lower by the RPM differential point 268 and closer to the more economical line 262 with respect to fuel consumption.

Comparison unit 245 registers line 264, which follows line 263 to some extent, for testing if this line 264 exceeds the higher RPM limits.

If such is the case, a shift signal is given. A comparison with line 265 or 266 is also given. If the point of operation is closer to the small RPM, or beyond line 266, a shift signal will then request a lower gear. Border lines 264, 266 must conform with either a larger or a smaller RPM figure, depending on the gear newly selected.

Border line 264 must be shifted to a higher RPM when the next higher gear indicates a reduction in efficiency compared to the previously experienced gear. It may be necessary to shift line 266 to higher RPM values, as the motor can no longer operate economically with lower speeds.

Figure 7:
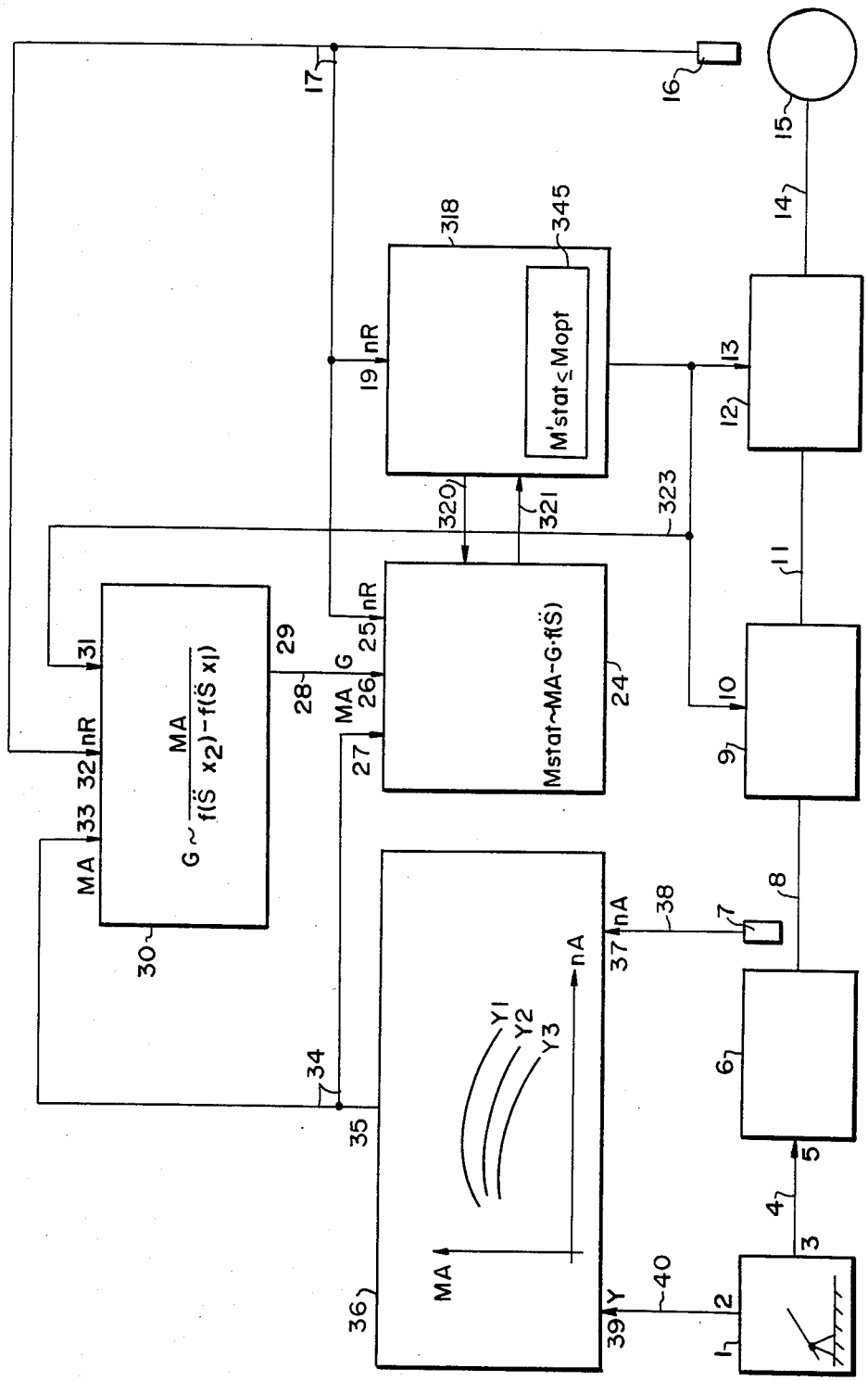
FIG. 7 is a schematic diagram showing the essential elements of another alternative embodiment of the invention.

Reference is now made to FIG. 7 of the drawings, which shows in a simplified manner, the basic elements of a motor vehicle having another alternative embodiment of the invention. The vehicle drive train in this embodiment consists of an internal combustion engine 306, which can be operated in conjunction with fuel supply generator 1, whereby the amount of fuel supply can be controlled. The motor 6 is connected by way of a drive shaft 8 and is coupled to a clutch 9 which, in turn, is coupled with a transmission 12 by way of a shaft 11. Transmission 12 drives a shaft 14 which, in turn, drives the wheel 15 of the vehicle. For simplicity sake, only one driven wheel 15 has been shown.

Fuel supply generator 1, for the control of the amount of fuel supplied to motor 6, shows a signal or fuel outlet terminal 3, which is connected through a fuel line 4 to a signal or fuel inlet receiver 5 of motor 6. Fuel supply generator 1 is equipped with a unit which shows the position of fuel supply generator 1 as a signal unit Y. As before, this signal unit Y can be activated over a signal terminal 2 of fuel supply generator 1. In the simplest case, the fuel supply generator 1 has a standard mechanical gas pedal to control the fuel supply to the motor 6. The fuel supply generator 1 can, however, also be controlled electrically or electronically, when the motor 6 can be controlled by means of a control signal.

The clutch 9, between drive shaft 8 and shaft 11, can be activated by means of a control signal 323 which will be conducted to clutch 9 at a signal inlet terminal 10.

Transmission 12 can also be controlled electrically, whereby signal inlet terminal 13 of transmission 12 is used to receive the respective control signals 323 for the desired gear ratio. Clutch 9, as well as gear transmission 12, can be activated mechanically, whereby signal inlet terminals 10 and 13 onstitute a connection of coupling and transmission activators with the respective controls for clutch 9 and transmission 12.

To control transmission 12, a transmission control device 318 has been provided. In the simplest case, this transmission control device 318 will shift the gears of transmission 12 in relation to the vehicle velocity, and thus automatically in relation to the RPM $n_R$ of the driven wheel 15. To record the speed $n_R$ of the driven wheel 15, a sensor 16, such as a tachometer, will be used with an RPM signal 17 which is channelled to the gear transmission control device 318 through signal line 17 and signal inlet terminal 19. A signal exits at 322, and signal lines 323 are connected to gear transmission control device 318 with signal inlet terminals 13 of transmission 12 an terminal 10 of clutch 9.

When a new gear ratio is determined by gear transmission control device 318, in relation to vehicle speed and other predetermined data, clutch 9 is activated through signal inlet 10, and transmission 12 is shifted with separated clutch 9 by gear transmission control device 318 through signal inlet terminal 13. Clutch 9 is then reengaged. The control or activation of clutch 9 and gear transmission 12 can, as shown above, be activated mechanically by means of servomotors, if desired, contained within gear transmission control device 318.

To the above selection criteria, according to which gear transmission control device 318 determines a new gear ratio, there is incorporated a verification of the fact that motor 6, after engagement of the new ratio, is capable of providing for a continuation of the driving of the vehicle without either deceleration or acceleration. A provision "necessary stationary torque" means that, the selected new gear must provide a respective optimal or adequate drive torque $M_{opt}$ with a higher value than is necessary for either the deceleration or acceleration free vehicle speed with a drive torque of $M_{stat}$. The optimum drive torque selected for the new gear ($M_{opt}$) can be additionally determined under consideration of the criteria with regard to fuel consumption.

For the comparison to be carried out between the stationary drive torque $M_{stat}$ and the new optimum drive torque $M_{opt}$ for the selected new gear ratio, a comparison unit 345 has been incorporated into, and is an integral part of, transmission gear control device 318. Also included in the transmission gear control device 318 is a unit which serves for the retention and/or mathematical determination of the optimum or adequate drive torque $M_{opt}$ for the individual gears of transmission 12. It is understood that the respective stationary drive torque $M_{stat}$ cannot be compared with the drive torque $M_{opt}$ of the selected new gear, because the stationary torque $M_{stat}$ is transformed according to the gear ratio from the prevailing gear to the selected new gear. For this reason, the given sample lists $M'_{stat}$ instead of $M_{stat}$. It is possible, however, to make a comparison between other data according to the gear ratio; such as, forces, output or such data that gives only one of several data for the comparison.

All drive torques $M_{opt}$ and $M'_{opt}$ relate to the values shown on the motor characteristic field memory storage device 36. For calculating or determining the stationary drive torque $M_{stat}$ and the respective drive size, a torque control unit 24 is used, which provides the required stationary drive force (e.g. $M_{stat}$ or $M'_{stat}$) through signal lines 321 to the gear transmission control device 318, whenever gear transmission control device 318 requests the respective data through the signal line 320. This assures that gear transmission control device 318, after selection of a new gear ratio according to the RPM $n_R$ of the driven wheel 15, will conduct a comparative analysis for all gear ratios selected. The result of this comparison is the selection of the most advantageous gear ratio with which the vehicle will be driven without noticeable deceleration, or the assurance that no gear ratio will be used, because no other ratio can assure an operation without deceleration of the vehicle.

With the torque control device 24, the respective stationary drive torque $M_{stat}$ is determined by the difference between the actual momentary torque $M_A$ of the vehicle and a mathematical value which is derived from the weight of the vehicle and the momentary acceleration. In accordance with this invention, to calculate the difference mentioned, the torque control device 24 will receive the momentary drive torque $M_A$ of motor 6 by way of signal lead 27, weight G of the vehicle by way of signal lead 26 and the revolutions $n_R$ of the driven wheel 15 by way of signal inlet 25, which were transmitted through signal lead 17 after being taken from the driven wheel 15.

Signal inlet 27 of torque control device 24 is connected through a signal line 34 to signal terminal 35 of a motor characteristic field memory storage device 36, which issues a signal at terminal 35 which corresponds to the momentary drive torque of the motor 6. The signal entry 26 of torque control device 24 is connected through a signal line 28 to a weight-calculating unit 30 to determine the weight G of the vehicle. At the signal exit terminal 29 of the weight-calculating unit 30, a signal 28 is issued, which corresponds to the vehicle weight G. The signal entry 25 of torque control device 24 is connected through signal line 17 with an RPM generator 16, such as a tachometer, to record the RPM $n_R$ of the driven wheel 15. The torque control device 24 will determine the time span of the rotation $n_R$ of the driven wheel 15 in order to calculate the acceleration $\ddot{s}$ of the vehicle. The respective momentary drive torque $M_A$ of motor 6 is derived from curves stored in motor characteristic field memory storage device 36, which contains the following data: the momentary drive torque $M_A$ of motor 6, the rotation $n_A$ of the motor 6, and the position Y of the fuel supply generator (gas pedal) 1. The illustration contains the curves stored in memory storage device 36 for various data ($Y_1$, $Y_2$, $Y_3$) of position Y for fuel supply generator 1 with a demarcation line in relation to the momentary drive torque $M_A$ from RPM $n_A$.

The weight of the vehicle is calculated, as described above, in weight-calculation device 30.

With the above embodiments described, it is further possible to include an additional calculating means when other values are to be considered. For example, a comparison between such constant speed drive torque of the drive shaft of the engine in an old gear position as opposed to said constant speed drive torque of the drive shaft of the engine in a new gear position, while taking into consideration the gear ratio of such old gear with the gear ratio of the new gear. This can be accomplished by setting up in the computing means the mathematical relationship:

$$M'_{stat} = M_{stat} i/i' \qquad 5$$

wherein, $M_{stat}$ = constant speed drive torque of engine in the engaged gear position,
$M'_{stat}$ = constant speed drive torque of engine in another gear position,
i = gear ratio of said engaged gear position, and
i' = gear ratio of said other gear position.

While a number of different embodiments have been shown in the drawings and described in the specification above, it will become obvious to those persons skilled in the art that various other modifications and adaptations can be made without departing from the spirit and scope of the claims attached hereto.

I claim:

1. An apparatus to determine the constant speed drive torque of a vehicle engine, said apparatus comprising:
   (a) a first means for providing a signal having a value that is representative of a momentary drive torque of such vehicle engine;
   (b) a second means for providing a signal having a value that is representative of the weight of such vehicle connected to receive said signal value directly from said first means;
   (c) a third means for providing a signal having a value that is representative of the acceleration of such vehcile at a preselected time and under preselected driving conditions connected to transmit said signal value directly to said second means;
   (d) a fourth means for generating a signal having a value that is representative of a constant speed drive torque of such vehicle engine, said signal generating fourth means connected to receive said signal value directly from said first means and said signal value directly from said second means and said signal value directly from said third means, said signal generating fourth means determining said constant speed drive torque by subtracting the product of said weight representative signal value and said acceleration representative signal value from the value of said momentary drive torque representative signal and generating said signal value that is representative of said constant speed drive torque; and
   (e) a fifth means connected to receive said signal value directly from said fourth means for controlling such vehicle in response to said constant speed drive torque representative signal.

2. An apparatus, according to claim 1, wherein said first means comprises:
   (a) a means for providing a signal having a value that is representative of the rotational speed of such vehicle engine's drive shaft;
   (b) a means for providing a signal having a value that is representative of the amount of fuel being supplied to such vehicle engine;
   (c) a means for storing a plurality of functions, each of said functions having a unique value representative of said momentary drive torque of such vehicle enging with respect to such rotational speed of such drive shaft of such vehicle's engine and such amount of fuel being supplied to such vehicle engine, said means for storing said plurality of functions electrically connected directly to said means for providing said signal value representative of such rotational speed of such drive shaft of such vehicle engine and directly to said means for providing said signal value representative of such amount of fuel being supplied to such vehicle engine; and
   (d) a signal generating means for providing said signal having a value that is representative of said momentary drive torque of such vehicle engine directly to said second means and directly to said fourth means, said signal generating means generating said signal value by comparing said functions with said signal value representative of such rotational speed of such drive shaft and said signal value representative of such amount of fuel being supplied to such vehicle engine.

3. An apparatus, according to claim 1, wherein such vehicle's engine is an internal combustion engine and the amount of fuel supplied to said engine is manually controllable by a driver of such vehicle.

4. An apparatus to determine the constant speed drvie torque of a vehicle engine, said apparatus comprising:
   (a) a first means for providing a signal having a value that is representative of the weight of said vehicle;
   (b) a second means for providing a signal having a value that is representative of the acceleration of such vehicle at a preselected time and under preselected driving conditions;
   (c) a third means for providing a signal having a value that is representative of the rotational speed of such vehicle engine's drive shaft;
   (d) a fourth means for providing a signal having a value that is representative of the amount of fuel being supplied to such vehicle engine;
   (e) a fifth means for storing a plurality of functions, each of said functions having a unique value representative of a momentary drive torque of such vehicle engine with respect to said rotational speed of such drive shaft of such vehicle's engine and such amount of fuel being supplied to such vehicle engine, said means for storing said plurality of functions electrically connected to said third means for providing said signal value representative of said rotational speed of such drive shaft of such vehicle engine and to said fourth means for providing said signal value representative of such amount of fuel being supplied to such vehicle engine; and
   (f) a signal generating sixth means for providing a signal having a value that is representative of said momentary drive torque of such vehicle engine to said second means, said signal generating sixth means generating said signal value by comparing said functions with said signal value representative of said rotational speed of such drive shaft an said signal value representative of such amount of fuel being supplied to such vehicle engine;
   (g) a seventh means for generating a signal having a value that is representative of a constant speed drive torque of such vehicle engine, said signal generating seventh means connected to receive said signal value directly from said sixth means and said signal value directly from said first means and said signal value directly from said second means, said signal generating seventh means determining said constant speed drive torque by subtracting the product of said weight representative signal value and said acceleration representative signal value from the value of said momentary drive torque representative signal and generating said signal value that is representative of said constant speed drive torque; and (h) an eighth means for controlling such vehicle in response to said constant speed drive torque representative signal, said eighth means connected in a manner to receive said constant speed drive torque representative signal value directly from said seventh means.

5. An apparatus, according to claim 4, wherein said second means comprises:

(a) a means for calculating said weight of such vehicle electrically connected to said first means to receive at least one signal value directly therefrom that is representative of said momentary drive torque of such vehicle's engine and electrically connected to said third means to receive directly therefrom at least two signal values that are representative of said acceleration of such vehicle at said preselected time and under said preselected driving conditions, said calculation of said weight of such vehicle is performed according to the relationship:

$$G \approx \frac{M_A}{f(\ddot{s}_{x1}) - f(\ddot{s}_{x2})};$$

(b) a means for providing a signal directly to said calculation means that is representative of said preselected time and when said preselected driving conditions are present in such vehicle; and (c) a signal generating means for providing said signal value representative of said weight of such vehicle as determined by the solution to said relationship directly to said fourth means, said signal generating means being positioned within said calculating means.

6. An apparatus, according to claim 5, wherein said calculating means further comprises a means for establishing the formation of the ratio of said momentary drive torque of such drive shaft to the differential of said at least two signal values representative of said acceleration of such vehicle at said preselected time and under said preselected driving conditions.

7. An apparatus, according to claim 6, wherein said means for providing said signal to said calculating means representative of said preselected time and when said preselected driving conditions are present further comprises:

(a) a clutch connected on one side thereof to such drive shaft of such vehicle engine and on the opposed side thereof to a shaft which is connected to such vehicle's transmission;

(b) a control means for engaging and disengaging said clutch in response to a first control signal, said control means being connected to receive said first control signal directly from said fifth means; and (c) a means for supplying said first control signal directly from said fifth means to said calculating means so that at least one of said at least two signal values that are representative of said acceleration of such vehicle will be taken with said clutch in a disengaged condition and the other of said at least two signals will be taken at a time when said clutch is engaged.

8. An apparatus, according to claim 5, wherein said second means further comprises:

(a) a means for forming an average value for said signal value representative of said weight of such vehicle from a plurality of previously determined different weight values; and (b) means for supplying said average value of said weight in said signal value that is representative of said weight of such vehicle.

9. An apparatus, according to claim 5, wherein said second means further comprises a means for analyzing weight values and utilizing only those weight values that do not exceed a specified deviation from a specified weight value.

10. An apparatus, according to claim 9, wherein said specified weight value is a previously determined weight value for said weight of such vehicle.

11. An apparatus, according to claim 9, wherein said second means further comprises a means for providing a signal value representative of a fixed specified weight value when said signal to said calculating means representative of said preselected time and said preselected driving conditions is outside a preselected range of values.

12. An apparatus, according to claim 4, wherein said third means comprises:

(a) a speed sensing means positioned on such vehicle for determining the rotational speed of at least one driven wheel of such vehicle and for generating a signal value representative of said rotational speed; and (b) a differentiating means connected to receive said signal value from said speed sensing means for determining an acceleration value derived from the time slope of said rotational speed of said driven wheel, said differentiating means connected to supply said differentiated signal value representative of such vehicle's acceleration directly to said second means, and directly to said fourth means, and directly to said fifth means.

13. An apparatus, according to claim 12, wherein said speed sensing means is a tachometer.

14. An apparatus, according to claim 4, wherein said fourth means further comprises a calculating means for said determining of said constant speed drive torque according to the relationship:

$$M_{stat} \propto M_A - G \cdot f(\ddot{s})$$

wherein,
$M_{stat}$ = constant speed drive torque,
$M_A$ = momentary drive force,
$\ddot{s}$ = vehicle acceleration, and
$G$ = vehicle weight.

15. An apparatus, according to claim 14, wherein said calculating means determines a value for said $M_{stat}$ continuously.

16. An apparatus, according to claim 14, wherein said calculating means further comprises a means for calculating additional values according to the relationship:

$$M'_{stat} = M_{stat} i/i'$$

wherein,
$M_{stat}$ = constant speed drive torque of engine in the engaged gear position,
$M'_{stat}$ = constant speed drive torque of engine in another gear position,
i = gear ratio of said engaged gear position, and
i' = gear ratio of said other gear position.

17. An apparatus, according to claim 4, wherein said fifth means controls gear changes in a transmission control system of such vehicle.

18. An apparatus, according to claim 4, wherein said fifth means further comprises a means for requesting said constant speed drive torque representative signal value directly connected to said fourth means.

19. An apparatus, according to claim 4, wherein said fifth means further comprises at least one comparator device therein for comparing said constant speed drive torque representative signal value with a predetermined value.

20. A control system which operates in conjunction with a motor vehicle transmission, said control system comprising:
(a) a first means for determining a momentary drive torque of such vehicle's engine and for generating a signal having a value that is representative of said momentary drive torque;
(b) a second means for determining the acceleration of such vehicle, said determination occurring at a preselected time and under preselected driving conditions, said second means generating a signal having a value that is representative of the acceleration of such vehicle;
(c) a third means for determining the weight of such vehicle connected to receive at least one signal value directly from said first means and at least two signal values directly from said second means, said at least one signal value received from said first means and said at least two signal values received from said second means being transmitted to said third means for calculating said weight of such vehicle, said third means generating a signal having a value that is representative of said calculated weight;
(d) a fourth means for generating a signal having a value that is representative of a constant speed drive torque of such vehicle engine's drive shaft, said signal generating fourth means being connected to receive said signal value directly from said first means and said signal value directly from said second means and said signal value directly from said third means, said signal generating fourth means determining said constant speed drive torque by subtracting the product of said weight representative signal value and said acceleration representative signal value from the value of said momentary drive torque representative signal and generating said signal having a value that is representative of said constant speed drive torque;
(e) a transmission control means for generating a signal initiating a gear change, said transmission control means equipped to receive said signal value directly from said second means representative of said acceleration and said signal value directly from said fourth means representative of said momentary drive torque;
(f) a first comparator comparing said constant speed drive torque signal value with a plurality of values with respect to the engaged gear;
(g) a second comparator comparing said constant speed drive torque signal value with a plurality of values with respect to other gears; and
(h) output from said first comparator and said second comparator connected to said transmission control to determine an operating gear.

21. A control system, according to claim 20, wherein said fourth means further comprises a calculating means for said determining of said constant speed drive torque according to the relationship:

$$M_{stat} \propto M_A - G \cdot f(\ddot{s})$$

wherein,
$M_{stat}$ = constant speed drive torque,
$M_A$ = momentary drive force,
$\ddot{s}$ = vehicle acceleration, and
$G$ = vehicle weight.

22. A control system, according to claim 21, wherein said calculating means determines a value for said $M_{stat}$ continuously.

23. A control system, according to claim 21, wherein said calculating means further comprises a means for calculating additional values according to the relationship:

$$M'_{stat} = M_{stat} i/i'$$

wherein,
$M_{stat}$ = constant speed drive torque of engine in the engaged gear position,
$M'_{stat}$ = constant speed drive torque of engine in another gear position,
$i$ = gear ratio of said engaged gear position, and
$i'$ = gear ratio of said other gear position.

24. A control system, according to claim 23, wherein said transmission control means further comprises a blocking means for preventing the shifting into another gear if said second comparator indicates that said $M'_{stat}$ of such other gear is less than said $M_{stat}$ of such engaged gear.

25. A control system, according to claim 24, wherein said transmission control means shifts into a higher gear if said first comparator indicates that $M_{stat}$ of such higher gear is greater than the $M_{stat}$ of the engaged gear.

26. A motor vehicle transmission control system, said control system comprising:
(a) a first means for determining a momentary drive torque of such vehicle's engine and for generating a signal having a value that is representative of said momentary drive torque;
(b) a second means for determining the acceleration of such vehicle, said determination occurring at a preselected time and under preselected driving conditions, said second means generating a signal having a value that is representative of said acceleration of such vehicle;
(c) a third means for determining the weight of such vehicle connected to receive at least one signal value directly from said first means and at least two signal values directly from said second means, said at least one signal value received from said first means and said at least two signal values received from said second means being transmitted to said third means for calculating said weight of such vehicle, said third means generating a signal having a value that is representative of said calculated weight;
(d) a fourth means for generating a signal having a value that is representative of said constant speed drive torque, said signal generating fourth means being connected to receive said signal value directly from said first means and said signal value directly from said second means and said signal value directly from said third means, said signal generating fourth means determining said constant speed drive torque by subtracting the product of said weight representative signal value and said acceleration representative signal value from the value of said momentary drive torque representative signal and generating said signal value that is representative of said constant speed drive torque;

(e) a transmission control means for generating a signal for effectuating a required gear change connected to such vehicle's transmission, said transmission control means is equipped to receive said signal value directly from said second means representative of said acceleration and to receive said signal value directly from said fourth means that is representative of said momentary drive torque;

(f) new gear selection means in said transmission control means and connected to receive said signal value directly from said second means representative of said acceleration and connected to said means for generating a signal for effectuating said required gear change;

(g) a test means for determining if said momentary drive torque of such vehicle engine is sufficient to maintain operation of such vehicle at substantially the same speed in said new gear, said test means connected to receive said signal value directly from said fourth means representative of said momentary drive torque and to said new gear selection means; and (h) a means for blocking said shifting into said new gear when said test means indicates said momentary drive torque of said vehicle engine, when transmitted through said new gear, is insufficient to maintain substantially the same speed, said blocking means connected to said test means and to said means for generating said signal for effectuating said required gear change.

27. A motor vehicle transmission control system, according to claim 26, wherein said test means is a comparator.

28. A motor vehicle transmission control system, according to claim 26, wherein said fourth means further comprises a calculating means for said determining of said constant speed drive torque according to the relationship:

$$M_{stat} \propto M_A - G \cdot f(\dot{s})$$

wherein, $M_{stat}$ = constant speed drive torque,
$M_A$ = momentary drive force,
$\ddot{s}$ = vehicle acceleration, and
$G$ = vehicle weight.

29. A motor vehicle, according to claim 28, wherein said calculating means further comprises a means for calculating additional values according to the relationship:

$$M'_{stat} = M_{stat} i/i'$$

wherein, $M_{stat}$ = constant speed drive torque of engine in the engaged gear position,
$M'_{stat}$ = constant speed drive torque of engine in another gear position,
$i$ = gear ratio of said engaged gear position, and
$i'$ = gear ratio of said other gear position.

30. A motor vehicle transmission control system, according to claim 26, wherein said transmission control means further comprises a means for storing a plurality of value ranges for said momentary drive torques for each of said gears in such vehicle's transmission, said means for storing said momentary drive torque value ranges is connected to said test means.

31. A motor vehicle transmission control system, according to claim 26, wherein said control system further includes a means for determining a maximum momentary drive torque from a rotational speed limit of the drive shaft of such vehicle's engine.

32. A motor vehicle transmission control system, according to claim 31, wherein said means for determining said maximum momentary drive torque further comprises integral therewith a storage means for a plurality of RPM value ranges at constant momentary drive torque values.

33. An energy efficient motor vehicle transmission control system, said control system comprising:

(a) a first means for determining a momentary drive torque of such vehicle's engine and for generating a signal having a value that is representative of said momentary drive torque;

(b) a second means for determining the acceleration of such vehicle, said determination occurring at a preselected time and under preselected driving conditions, said second means generating a signal having a valve that is representative of said acceleration of such vehicle;

(c) a third means for determining the weight of such vehicle connected to receive at least one signal value directly from said first means and at least two signal values directly from said second means, said at least one signal value received from said first means and said at least two signal values received from said second means being transmitted to said third means for calculating said weight of such vehicle, said third means generating a signal having a value that is representative of said calculated weight;

(d) a fourth means for generating a signal having a value that is representative of said constant speed drive torque, said signal generating fourth means being connected to receive said signal value directly from said first means and said signal value directly from said second means and said signal value directly from said third means, said signal generating fourth means determining said constant speed drive torque by subtracting the product of said weight representative signal value and said accleration representative signal value from the value of said momentary drive torque representative signal and generating a signal having a value that is representative of said constant speed drive torque;

(e) a transmission control means for generating a signal for making a required gear change connected to such vehicle's transmission, said transmission control means is equipped to receive said signal value directly from said second means representative of said acceleration and said signal value directly from said fourth means that is representative of said constant speed drive torque;

(f) means for comparing said constant speed drive torque signal value with a plurality of predetermined economical constant speed drive torque value limits for various gears; and (g) said comparing means including a means for generating a signal when a gear shift will be outside said predetermined economical constant speed drive torque value limits.

34. An energy efficient transmission control system, according to claim 33, wherein said first means comprises:
   (a) a means for providing a signal having a value that is representative of the rotational speed of such vehicle engine's drive shaft;
   (b) a means for providing a signal having a value that is representative of the amount of fuel being supplied to such vehicle engine;
   (c) a means for storing a plurality of functions, each to said functions having a unique value representative of said momentary drive torque of such vehicle's engine with respect to such rotational speed of said drive shaft of such vehicle's engine and such amount of fuel being supplied to such vehicle's engine, said means for storing said plurality of functions electrically connected to said means for providing said signal value representative of such rotational speed of such drive shaft of such vehicle engine and to said means for providing said signal value representative of such amount of fuel being supplied to such vehicle engine; and
   (d) a signal generating means for providing said signal value that is representative of said momentary drive torque of such vehicle engine directly to said second means and directly to said fourth means, said signal generating means generating said signal value by comparing said functions with said signal value representative of such rotational speed of such drive shaft and said signal value representative of such amount of fuel being supplied to such vehicle engine.

35. An energy efficient transmission control system, according to claim 33, wherein said third means comprises:
   (a) a means for calculating said weight of such vehicle electrically connected to said first means to receive at least one signal value directly therefrom that is representative of said momentary drive torque of such vehicle's engine and electrically connected to said second means to receive directly therefrom at least two signal values that are representative of said acceleration of such vehicle at said preselected time and under said preselected driving conditions, said calculation of said weight of such vehicle is carried out according to the relationship:

$$G \approx \frac{M_A}{f(\ddot{s}_{x1}) - f(\ddot{s}_{x2})}$$

(b) a means for providing a signal to said calculation means that is representative of said preselected time when said preselected driving conditions are present in such vehicle; and
   (c) a signal generating means for providing said signal value representative of said weight of such vehicle as determined by the solution to said relationship, said signal generating means supplying said weight signal value directly to said fourth means, said signal generating means being positioned within said calculating means.

36. An energy efficient transmission control system, according to claim 35, wherein said means for providing said signal to said calculating means that is representative of said preselected time and when said predetermined driving conditions are present in such vehicle further comprises:
   (a) a clutch connected on one side thereof to such drive shaft of such vehicle engine and on the opposed side thereof to a shaft which is connected to such vehicle's transmission;
   (b) a control means for engaging and disengaging said clutch in response to a first control signal, said control means being connected to receive said first control signal directly from said transmission control means; and
   (c) a means for supplying said first control signal from said transmission control means directly to said calculating means so that at least one of said at least two signal values that are representative of said acceleration of such vehicle will be taken when said clutch is in a disengaged condition and the other of said at least two signal values will be taken at a time when said clutch is engaged.

37. An energy efficient transmission control system, according to claim 33, wherein said fourth means further comprises a calculating means for said determining of said constant speed drive torque according to the relationship:

$$M_{stat} \propto M_A - G \cdot f(\dot{s})$$

wherein,
   $M_{stat}$ = constant speed drive torque,
   $M_A$ = momentary drive force,
   $\dot{s}$ = vehicle acceleration, and
   $G$ = vehicle weight.

38. An energy efficient transmission control system, according to claim 37, wherein said calculating means further comprises a means for calculating additional values according to the relationship:

$$M'_{stat} = M_{stat} i/i'$$

wherein,
   $M_{stat}$ = constant speed drive torque of engine in the engaged gear position,
   $M'_{stat}$ = constant speed drive torque of engine in another gear position,
   $i$ = gear ratio of said engaged gear position, and
   $i'$ = gear ratio of said other gear position.

39. An energy efficient transmission control system, according to claim 33, wherein said comparing means further comprises a means for storing and for determining the boundry of said plurality of predetermined economical constant speed drive torque value limits.

40. An energy efficient transmission control system, according to claim 33, wherein said control system further comprises a second comparator having a second plurality of established economical constant speed drive torque value limits, said second comparator including a signal generating means.

41. An energy efficient transmission control system, according to claim 40, wherein upshifting of said transmission is controlled by said signal generating means in one of said two comparators and downshifting of said transmission is controlled by said signal generating means in the other of said two comparator means.

42. A transmission control system of a motor vehicle, said control system comprising:
   (a) a first means for determining a momentary drive torque of such vehicle's engine and for generating a signal having a value that is representative of said momentary drive torque;

(b) a second means for determining the acceleration of such vehicle, said determination occurring at a preselected time and under preselected driving conditions, said second means generating a signal having a value that is representative of said acceleration of such vehicle;

(c) a third means for determining the weight of such vehicle connected to receive at least one signal value directly from said first means and at least two signal value directly from said second means, said at least one signal value received from said first means and said at least two signal values received from said second means being transmitted to said third means for calculating said weight of such vehicle, said third means generating a signal having a value that is representative of said calculated weight;

(d) a fourth means for generating a signal having a value that is representative of said constant speed drive torque, said signal generating fourth means being connected to receive said signal value directly from said first means and said signal value directly from said second means and said signal value directly from said third means, said signal generating fourth means determining said constant speed drive torque by subtracting the product of said weight representation signal value and said acceleration representation signal value from the value of said momentary drive torque representative signal and generating said signal value that is representative of said constant speed drive torque;

(e) a transmission control means for generating a signal for effectuating a gear change is connected to such vehicle's transmission, said transmission control means is equipped to receive said signal value directly from said second means representative of said acceleration and said signal value directly from said fourth means representative of said constant speed drive torque; and (f) a comparator means for comparing said signal value representative of said constant speed drive torque with at least one optimum torque value and controlling gear shift changes in response to said comparison, said comparing means includes a signal generating means connected to said transmission control means for generating said signal for effectuating said gear change.

43. A transmission control system, according to claim 42, wherein said first means further comprises:

(a) a means for providing a signal value that is representative of the rotational speed of such vehicle engine's drive shaft;

(b) a means for providing a signal value that is representative of the amount of fuel being supplied to such vehicle's engine;

(c) a means for storing a plurality of functions, each of said functions having a unique value representative of said momentary drive torque of such vehicle engine with respect to such rotational speed of such drive shaft of such vehicle's engine and such amount of fuel being supplied to such vehicle engine, said means for storing said plurality of functions electrically connected to said means for providing said signal value representative of such rotational speed of such drive shaft and to said means for providing said signal value representative of such amount of fuel being supplied; and (d) a signal generating means for providing said signal value that is representative of said momentary drive torque of such vehicle engine directly to said second means and directly to said fourth means, said signal generating means generating said signal value by comparing said functions with said signal value representative of such rotational speed of such drive shaft and said signal value representative of such amount of fuel being supplied.

44. A transmission control system, according to claim 42, wherein said third means further comprises:

(a) a means for calculating said weight of such vehicle electrically connected to said first means to receive at least one signal value directly therefrom that is representative of said momentary drive torque of such vehicle's engine and electrically connected to said second means to receive directly therefrom at least two signal values that are representative of said acceleration of such vehicle at said preselected time and under said preselected driving conditions, said calculation of said weight of such vehicle is performed according to the relationship:

$$G \approx \frac{M_A}{f(\ddot{s}_{x1}) - f(\ddot{s}_{x2})}$$

(b) a means for providing a signal directly to said calculation means that is representative of said preselected time and when such vehicle's engine is in a driving condition and when such vehicle's engine is in a nondriving condition; and (c) a signal generating means for providing said signal value representative of said weight of such vehicle as determined by the solution to said relationship, said signal generating means supplying said weight signal value directly to said fourth means.

45. A transmission control system, according to claim 42, wherein said fourth means further comprises a calculating means for said determining of said constant speed drive torque according to the relationship:

$$M_{stat} \propto M_A - G \cdot f(\ddot{s})$$

wherein, $M_{stat}$ = constant speed drive torque,
$M_A$ = momentary drive force,
$\ddot{s}$ = vehicle acceleration, and
$G$ = vehicle weight.

46. A transmission control system, according to claim 45, wherein said calculating means further comprises a means for calculating additional values according to the relationship:

$$M'_{stat} = M_{stat} i/i'$$

wherein, $M_{stat}$ = constant speed drive torque of engine in the engaged gear position,
$M'_{stat}$ = constant speed drive torque of engine in another gear position,
$i$ = gear ratio of said engaged gear position, and
$i'$ = gear ratio of said other gear position.

47. A transmission control system, according to claim 42, wherein said comparator means further comprises a plurality of optimum constant speed drive torque values corresponding to different gear positions available in said transmission stored in said comparator means.

48. A transmission control system, according to claim 42, wherein said transmission control means further comprises a blocking means for preventing the shifting of said gears into a new position when a differential is established by said comparator means between said constant speed drive torque value prevailing in the engaged gear position and said optimum constant speed drive torque value for said new gear position is outside a predetermined range of values.

49. A method of determining the constant speed drive torque of an engine in a vehicle, and controlling gear changes in a transmission control system of such vehicle in response to said constant speed drive torque determination, said method comprising the steps of:
 (a) determining a momentary drive torque of such vehicle engine;
 (b) generating at least one signal value that is representative of said momentary drive torque determined in step (a);
 (c) transmitting said signal value generated in step (b) directly to an apparatus for computing the weight of such vehicle and directly to an apparatus for determining said constant speed drive torque of said engine;
 (d) determining the weight of such vehicle;
 (e) generating at least one signal value that is representative of said weight of such vehicle determined in step (d);
 (f) transmitting said signal value generated in step (e) directly to said apparatus for determining said constant speed drive torque of said engine;
 (g) determining the acceleration of such vehicle;
 (h) generating a signal value that is representative of said acceleration determining the step (g) at a preselected time and under a preselected driving condition of such vehicle;
 (i) transmitting said signal value generated in step (h) directly to said apparatus for computing said weight of such vehicle and directly to said apparatus for determining said constant speed drive torque of said engine and directly to said transmission control system;
 (j) determining a constant speed drive torque from said signals transmitted in steps (c,f and i) by subtracting the product of said signal value in step (f) and said signal value in step (i) from said signal value in step (c);
 (k) generating a signal value that is representative of said constant speed drive torque of such vehicle engine;
 (l) transmitting said signal value generated in step (k) directly to said transmission control system; and
 (m) governing such gear changes in such vehicle in response to said constant speed drive torque signal value transmitted in step (l).

50. A method of controlling a vehicle in response to a constant speed drive torque signal, according to claim 49, wherein said determination of said momentary drive torque of such vehicle engine comprises the steps of:
 (a) determining the amount of fuel being supplied to such vehicle engine;
 (b) generating at least one signal that is representative of said amount of fuel being supplied as determined in step (a);
 (c) transmitting said signal value generated in step (b) to a memory storage and comparator device;
 (d) determining the rotational speed of the drive shaft of such vehicle engine;
 (e) generating at least one signal that is representative of rotational speed of said drive shaft determined in step (c);
 (f) transmitting said signal value generated in step (e) to said memory storage and comparator device;
 (g) maintaining a plurality of curves in said memory storage and comparator device which provides a unique momentary drive torque value in conjunction with a unique value for said amount of fuel being supplied to such vehicle's engine correlated with a unique value for said rotational speed of said drive shaft for that amount of fuel; and
 (h) determining said momentary drive torque on such vehicle's engine from said plurality of curves by comparing said signals transmitted in steps (c and f) with said plurality of curves.

51. A method of controlling a vehicle in response to a constant speed drive torque signal, according to claim 49, wherein said determination of said weight comprises the steps of:
 (a) receiving at least one signal value that is representative of said momentary drive torque of such vehicle's engine in said apparatus for computing said weight;
 (b) receiving at least two signal values that are representative of said acceleration of such vehicle at preselected time periods and under preselected driving conditions in said apparatus for computing said weight;
 (c) establishing a functional relationship in said apparatus for computing said weight between said momentary drive torque and said acceleration, the solution of said functional relationship providing a weight value for such vehicle; and
 (d) determining said weight of such vehicle by calculating a solution to said functional relationship established in step (c) from said at least one signal value representative of said momentary drive torque received in step (a) and said at least two signal values representative of said acceleration received in step (b).

52. A method of controlling a vehicle in response to a constant speed drive torque signal, according to claim 49, wherein said determination of said acceleration of such vehicle comprises the steps of:
 (a) generating a signal value representative of the rotational speed of a driven wheel on such vehicle; and
 (b) differentiating said signal value in step (a) to arrive at said acceleration value.

53. A method of controlling a vehicle in response to a constant speed drive torque signal, according to claim 49, further comprising the steps of:
 (a) maintaining a plurality of curves in said transmission control system representing a range of operating limits for said constant speed drive torque; and
 (b) comparing said constant speed drive torque signal with said plurality of curves maintained in step (a) prior to effectuating a gear change.

54. A method of controlling a vehicle in response to a constant speed drive torque signal, according to claim 53, further comprising the step of blocking said gear change when said comparison indicates said constant speed drive torque is outside said range of said operating limits.

55. A method of controlling a vehicle in response to a constant speed drive torque signal, according to claim 54, further comprising the step of maintaining said plurality of curves for said range of said operating limits for said constant speed drive torque in a range which provides a balance between fuel economy and engine performance.

56. A method of determining the constant speed drive torque of an engine in a vehicle, and controlling gear changes in the transmission control system of such vehicle in response to such constant speed drive torque determination, said method comprising the steps of:
   (a) determining a momentary drive torque of such vehicle engine;
   (b) generating at least one signal value that is representative of said momentary drive torque determined in step (a);
   (c) determining the weight of such vehicle;
   (d) generating at least one signal value that is representative of said weight of such vehicle determined in step (c);
   (e) determining the accleration of such vehicle;
   (f) generating a signal value that is representative of said acceleration determined in step (e) at a preselected time and under a preselected driving condition of such vehicle;
   (g) transmitting said signal value generated in step (b) directly to a means for determining said weight of such vehicle in step (c) and directly to a means for determining said constant speed drive torque of such vehicle engine;
   (h) transmitting said signal value generated in step (d) directly to said means for determining said constant speed drive torque of such vehicle engine;
   (i) transmitting said signal value generated in step (f) directly to said means for determining said weight of such vehicle and directly to said means for determining said constant speed drive torque of such vehicle engine and directly to such transmission control system of such vehicle;
   (j) determining a constant speed drive torque from said signals generated in steps (b, d and f) by subtracting the product of said signal value in step (d) and said signal value in step (f) from said signal value in step (b);
   (k) generating a signal value that is representative of said constant speed drive torque of such vehicle engine;
   (l) transmitting said signal value generated in step (k) directly to such transmission control system of such vehicle; and
   (m) controlling such gear changes in such vehicle in response to said constant speed drive torque signal value generated in step (k).

* * * * *